United States Patent [19]
Sherer et al.

[11] Patent Number: 5,459,854
[45] Date of Patent: Oct. 17, 1995

[54] METHOD FOR OPTIMIZING SOFTWARE FOR ANY ONE OF A PLURALITY OF VARIANT ARCHITECTURES

[75] Inventors: W. Paul Sherer; Glenn W. Connery, both of Sunnyvale; Scott A. Emery, San Jose, all of Calif.

[73] Assignee: 3Com Corporation, Santa Clara, Calif.

[21] Appl. No.: 727,824

[22] Filed: Jul. 9, 1991

Related U.S. Application Data

[63] Continuation-in-part of Ser. No. 533,257, Jun. 4, 1990, abandoned.

[51] Int. Cl.⁶ .............................. G06F 9/24; G06F 9/445; G06F 15/177
[52] U.S. Cl. .................... 395/500; 395/700; 364/280; 364/280.2; 364/280.9; 364/281.1; 364/DIG. 1
[58] Field of Search ..................................... 395/500, 650, 395/700

[56] References Cited

U.S. PATENT DOCUMENTS

| | | | |
|---|---|---|---|
| 3,828,325 | 8/1974 | Stafford et al. | 395/325 |
| 4,200,915 | 4/1980 | Struger et al. | |
| 4,435,752 | 3/1984 | Winkelman. | |
| 4,449,181 | 5/1984 | Young et al. | |
| 4,589,063 | 5/1986 | Shah et al. | 395/500 |
| 4,626,986 | 12/1986 | Moni. | |
| 4,654,783 | 3/1987 | Veres et al. | |
| 4,701,848 | 10/1987 | Clyde | 395/800 |
| 4,849,878 | 7/1989 | Roy | 395/425 |
| 4,858,114 | 8/1989 | Heath et al. | 395/775 |
| 4,920,482 | 4/1990 | Hasebe et al. | |
| 4,961,133 | 10/1990 | Tolati et al. | |
| 4,970,639 | 11/1990 | Deifendroff et al. | |

FOREIGN PATENT DOCUMENTS

| | | |
|---|---|---|
| 1000413 | 11/1976 | Canada. |
| 0100140A3 | 7/1991 | European Pat. Off.. |
| 59-47645 | 3/1984 | Japan. |

OTHER PUBLICATIONS

"Automatic Configuration of a Personal Computer System", IBM Technical Disclosure Bulletin, vol. 32, No. 4B, Sep. 1989, pp. 112–115.

Primary Examiner—Kevin J. Teska
Assistant Examiner—Ayni Mohamed
Attorney, Agent, or Firm—Haynes & Davis

[57] ABSTRACT

A method allows a designer to implement software for a wide variety of variant host architectures, without excessive usage of host memory, nor sacrificing the capabilities of high end versions of the variant architectures available. The method is based on providing an initialization module of the software to host memory. A portion of the initialization module determines the host architecture. Based on the determined host architecture, the unneeded portions of the initialization module are freed, and the needed portions are relocated into a contiguous memory space to minimize host memory usage. Any location dependent entries in the needed portions of the program are then updated based on the relocation. The initialization module includes a plurality of code blocks, each of which is optimized to a particular variant architecture. When the variant architecture of the host is identified, those code blocks which are optimized to the identified host are selected and the other code blocks are freed. The selected blocks are then relocated to optimize host memory usage.

12 Claims, 11 Drawing Sheets

INITIALIZATION PROCESS FLOW CHART

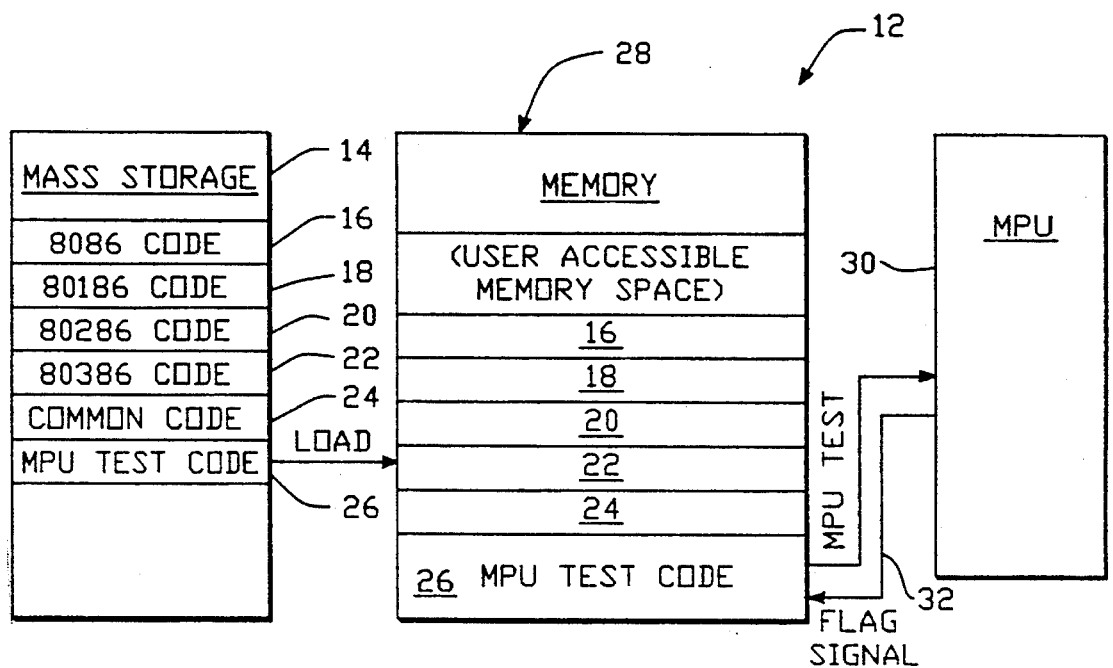
FIG.−2
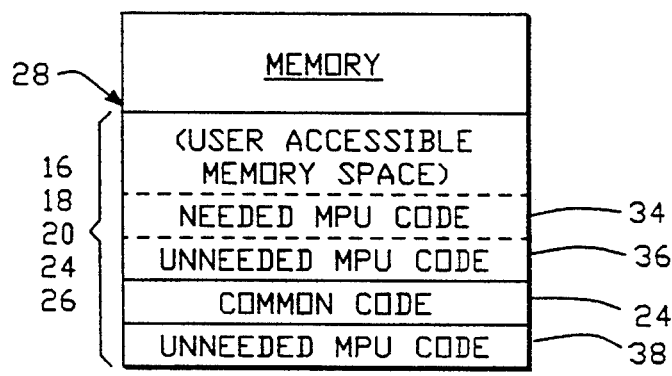
FIG.−3
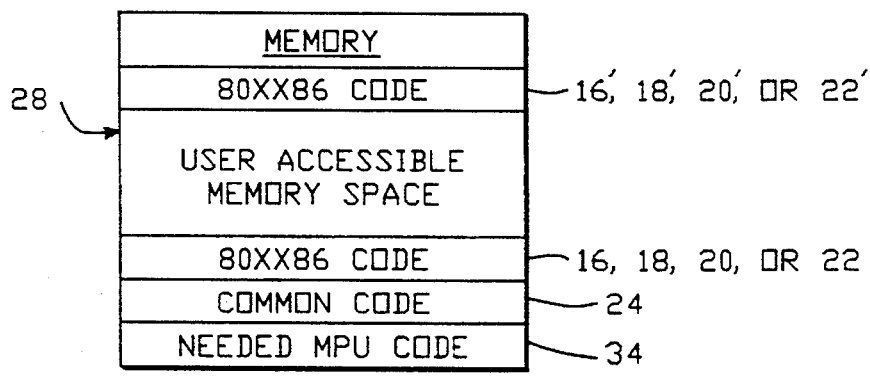
FIG.−4

CONFIGURATION MEMORY IMAGE PARSING FLOW CHART

FIG.—8

"PHYSICAL TO VIRTUAL ADDRESS TRANSLATIONS ALLOWED" DETERMINATION FLOW CHART

CODE RELOCATION FLOW CHART

FIG.—11

| Bit | Value | Description |
|---|---|---|
| 0 | X | CPU TYPE |
| 1 | X | |
| 2 | X | |
| 3 | X | OPERATING SYSTEM |
| 4 | X | USE DEVHLP CALLS |
| 5 | X | ASYNCH TRANSFER DATA |
| 6 | X | EARLY RECIEVELOOKAHEAD |
| 7 | X | ALLOW GDT ADDRESSES |
| 8 | 0 | NOT USED, ALWAYS ZERO |
| 9 | 0 | NOT USED, ALWAYS ZERO |
| 10 | 0 | NOT USED, ALWAYS ZERO |
| 11 | 0 | NOT USED, ALWAYS ZERO |
| 12 | 0 | NOT USED, ALWAYS ZERO |
| 13 | 0 | NOT USED, ALWAYS ZERO |
| 14 | 0 | NOT USED, ALWAYS ZERO |
| 15 | 0 | NOT USED, ALWAYS ZERO |

FIG.-12

EXAMPLE INDEX TABLE

| | | 147a | 147b | 147c |
|---|---|---|---|---|
| 00 | 2 | | | |
| 02 | 0002h | 0005h | 0000h | |
| 08 | 0003h | 0004h | 0001h | |

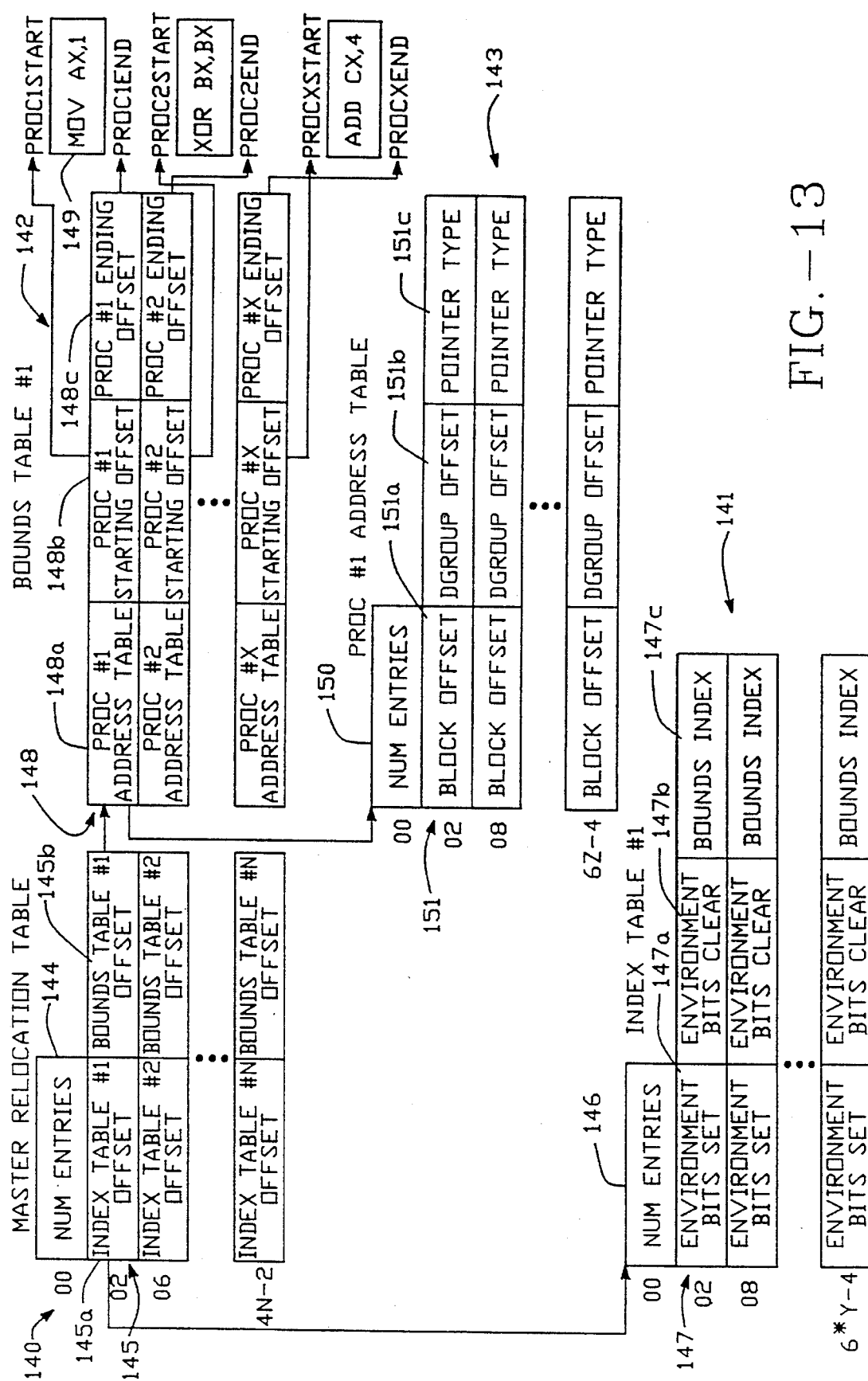
FIG.—13

METHOD FOR OPTIMIZING SOFTWARE FOR ANY ONE OF A PLURALITY OF VARIANT ARCHITECTURES

CONTINUING APPLICATION DATA

The present application is a continuation-in-part of U.S. patent application entitled "METHOD FOR AUTOMATIC OPTIMIZATION OF CPU SOFTWARE FOR 86-CLASS MICROPROCESSORS IN A NETWORK ENVIRONMENT", invented by W. Paul Sherer and Glenn Connery, having Ser. No. 07/533,257, now abandoned and filed on Jun. 4, 1990.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to techniques for initializing software, such as device drivers for network interface controllers, in a host data processing system. More particularly, the invention relates to a process for loading a software product in host memory, and then optimizing the product for the particular architecture of the host data processing system.

2. Description of Related Art

Computer systems have been implemented according to a large number of variant architectures, where the architecture is defined as the hardware components, such as the CPU type, which make up the system and the software operating system which provides a platform for accomplishing a variety of applications.

The CPU type in a given architecture may include a kind of microprocessor which is used in the CPU. Microprocessor types include the "86" class of microprocessors, originating with and manufactured primarily by Intel Corporation. This class of microprocessors includes the models designated 8086, 8088, 80186, 80286, 80386, 80486, as well as any other microprocessor which shares substantially the same instruction set. Each microprocessor in this family uses a common subset of instructions but have unique capabilities which distinguish them from one another. Other microprocessor classes include the 68000 class provided by Motorola, and a variety of RISC processors made by a number of companies.

Operating system types include most commonly MS-DOS in a variety of versions, developed by Microsoft Corporation of Bellevue, Washington, and variants thereof. Also, the OS/2 operating system, the UNIX operating system and others have been developed for a wide variety of system architectures.

Thus, an architecture of a data processing system is defined by the hardware which makes up its central processing unit and related components, and the operating system software which provides a platform for running application software and the like. A manufacturer of add-on devices designed to handle a plurality of variant architectures must provide software for controlling the add-on devices which runs in each of the variant architectures. This software is typically referred to as a device driver. Therefore, typically prior art systems required a number of versions of device drivers written for each variant architecture for which the add-on device is intended to run. The user must be able to select which device driver applies to his data processing system, and the manufacturer must distribute a large number of versions. This requires an intelligent user for loading and initializing the device driver.

Alternatively, tradeoffs are made in the design of the device driver. For instance, if one is interested in accommodating only the 86 class of microprocessors, the device driver must be written in only the common subset of instructions which is executed by all of the processors in the class. Thus, data processing systems which Use the high end versions of the 86 class have device drivers which do not use the capabilities of that system to their fullest extent.

To assist the user in identifying which microprocessor is used in a given data processing system, manufacturers of such microprocessors typically disclose techniques for recognizing the microprocessor in use. These techniques involve testing the functions of the microprocessor such that the results uniquely indicate which type is in use. These tests can be used for optimizing code usage by a particular microprocessor.

Computer architectures are typically designed with a limited amount of user accessible random access memory. For instance, the 86 class of microprocessors and the MS-DOS operating system were originally intended to be useful only with a base of 640 kilobytes of user accessible memory. This limitation represents a major memory usage limitation in certain applications of computers employing a given variant architecture.

Applications programs, including drivers, resident portions of operating systems, terminate and stay resident programs, and other software, must generally occupy a portion of this user accessible memory during operation of the computer. Where the computer is installed as a node of a local area network or the like, a certain amount of this memory space must be set aside for device drivers for the network interface. Thus, it is important to minimize the amount of space occupied by device drivers and the like in order to allow applications of the computer system maximum access to user accessible space.

Therefore, the designer who is intent on distributing software in executable form which must occupy a portion of the user accessible space in a computer system, must account for the variant architectures for which the particular device is intended to be used. One approach of doing so, the operating system is optimized for each particular variant and a selection is made by the user of the correct version of the device driver for his system to be loaded. In another approach, all optional versions are loaded into the limited user accessible space together, thereby using up more space than necessary. Alternatively, the device drivers are written with only the common subset of instructions available to all of the architectures for which the driver is written. In this case, the designer is not able to take advantage of the power and versatility of the more advanced architectures.

Accordingly, there is a need for a process for optimizing software for the particular variant host architecture without sacrificing advanced processes available to the advanced architectures, nor wasting user accessible space with versions of code that are not used in the particular host.

SUMMARY OF THE INVENTION

The present invention provides a process which allows a designer to implement software for a wide variety of variant host architectures, without excessive usage of host memory, nor sacrificing the capabilities of high end versions of the variant architectures available.

The method is based on providing an initialization module of the software to host memory. A portion of the initialization module determines the host architecture. Based on the determined host architecture, the unneeded portions of the initialization module are freed, and the needed portions are relocated into a contiguous memory space to minimize host memory usage. Any location dependent entries in the needed portions of the program are updated based on the relocation.

Thus, the initialization module may include a plurality of code blocks, each of which is optimized to a particular variant architecture. When the variant architecture of the host is identified, those code blocks which are optimized to the identified host are selected and the other code blocks are freed. The selected blocks are then relocated to optimize host memory usage.

According to one aspect of the present invention, the code blocks are organized into a plurality of functional segments, where each segment includes at least one code block optimized for at least one variant architecture. After identification of the host system, a code block from each functional segment in the plurality of functional segments is selected to form the host memory resident portion of the operating system.

In one implementation, the initialization module includes tables for identifying locations of code blocks and of location dependent entries within the code blocks, based on the identified variant architecture. In order to select particular code blocks, the system accesses the tables in response to the identified variant architecture to identify the selected code blocks, accesses the selected code blocks and updates location dependent entries in the code blocks using the tables.

According to another aspect of the invention, the initialization module includes a program for identifying the host architecture. Where the host architecture includes a configuration table, this program identifies the host by parsing the configuration table. Where there is no configuration table, or the configuration memory does not provide enough information, the program executes tests to determine the features of the host architecture for the purpose of identifying the variant in which the program has been loaded.

The present invention is particularly suited to initializing operating system software for controlling an add-on device, such as a network interface driver, where the network interface driver includes software for transmitting and receiving data through the network interface.

Accordingly, the present invention allows a designer to provide a single initialization module to users of his product in a wide variety of variant architectures. The user of the product then is relieved of the duty of selecting the particular version of the device driver. The code is automatically optimized for the architecture without user involvement and without wasting host memory space.

Other aspects and advantages of the present invention can be seen upon review of the figures, the detailed description, and the claims which follow.

BRIEF DESCRIPTION OF THE FIGURES

FIG. 2 is a block diagram of a portion of a computer system illustrating movement of executable computer code according to one embodiment of the present invention.

FIG. 3 is a block diagram of a stage of memory allocation during one step of processing in accordance with one embodiment of the present invention.

FIG. 4 is a block diagram of a state of memory allocation during a further step of processing in accordance with one embodiment of the present invention.

FIG. 12 is a diagram of a machine environment variable used for selecting code blocks according to a preferred embodiment of the present invention.

FIG. 13 is a schematic diagram of the tables used for selecting code blocks and updating location dependent entries in code blocks according to a preferred embodiment of the present invention.

FIG. 14 is a block diagram of an example index table according to a preferred embodiment of the present invention.

DETAILED DESCRIPTION

With reference to the figures, a detailed description of a preferred embodiment of the present invention is provided. FIGS. 1–5 provide a generic description of the invention, while FIGS. 6A, 6B, and 7–14 are used to illustrate a preferred embodiment.

Overview

Figure 1:
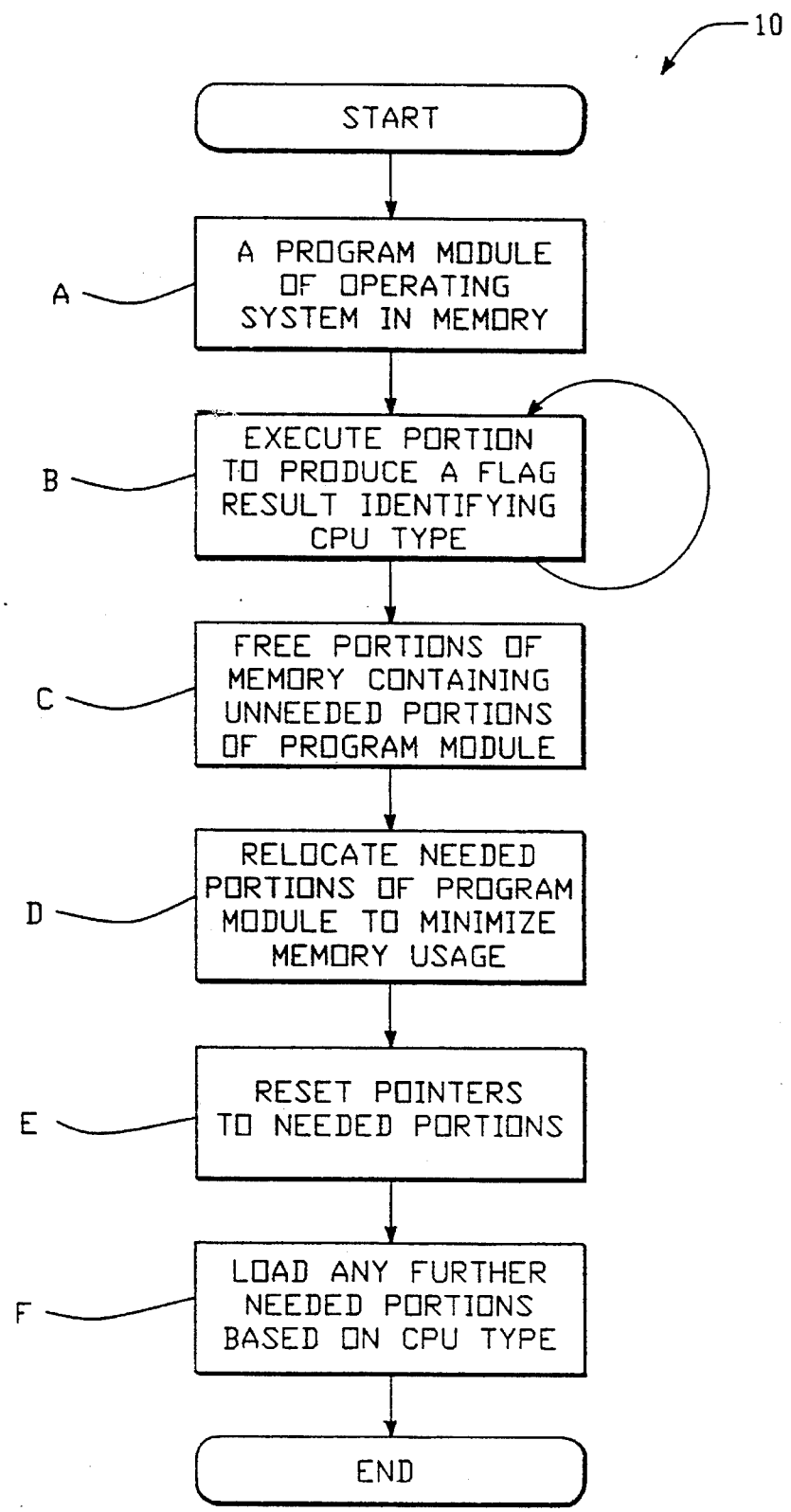
FIG. 1 is a flow chart of a program for initializing a computer operating system program in accordance with the present invention.

Referring to FIG. 1, there is shown a flow chart 10 representative of one method in accordance with the invention. FIG. 2 illustrates relevant portions of a computer system 12 for illustrating operation in accordance with the invention. Stored in mass storage 14 is for example a single executable operating system program suitable for any one of various microprocessors, such as the "86" family of microprocessors. Individual elements 16, 18, 20, 22 represent different encoded operating system segments forming a part of the operating system program, but each optimized for a specific microprocessor 30 (of a type yet to be identified), and program element 24 represents an encoded operating system segment which operates equally well with all of the types of microprocessor 30. Included is a program element 26 which is useful to identify the type of microprocessor. This program element 26 may be a set of instructions which executes uniquely with each of the types of microprocessors and which returns a flag of some value which identifies the type of microprocessor. It may be executable code comprising a series of tests which selectively eliminates microprocessor types as choices without resulting in an abortive attempt at execution of instructions.

The process according to the invention starts by loading all of the program elements 16, 18, 20, 22, 24, 26 of the operating system from a mass storage system 14 into system memory 28 (Step A, FIG. 1).

The program element 26 is then executed by the microprocessor 30 as the test for the type of the microprocessor 30 in use (Step B). With each test, a flag signal 32 is returned to the program module as a parameter for use in further execution of the program element 26 until the type of microprocessor in use is uniquely identified.

Once the type of microprocessor is identified, the program element 26 then identifies which portions 34 of itself are still needed and which portions 36, 38, of itself are no longer needed (FIG. 3), and the memory locations corresponding to those unneeded portions 36, 38 are released or freed for use by other programs (Step C). In order to compact the storage of the needed portion 34, the needed portion 34 may be relocated within the memory 28 (Step D and FIG. 4). Pointers to the needed portions 34 are reset (Step E), and other portions of the operating system (if any) can be loaded (Step F).

The relocated portions 16, 18, 10, or 22 may be within user-accessible memory space, or in protected memory space as portions 16', 18', 20', or 22', as shown in FIG. 4. The choice is typically microprocessor dependent. Control of the computer can then be turned over to other processes.

Network Interface Driver of a Preferred Embodiment

Figure 5:
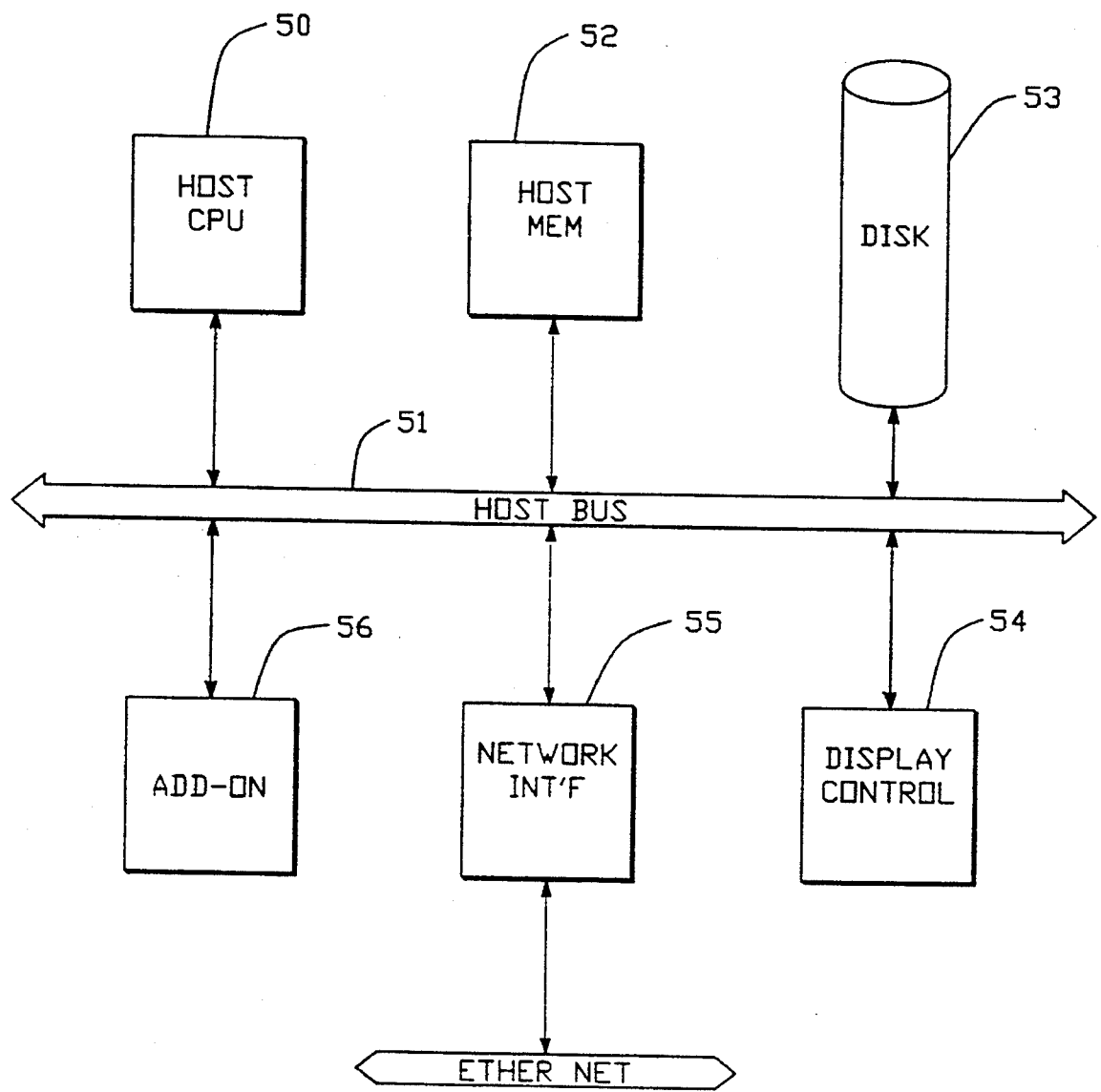
FIG. 5 is a block diagram of a typical host system in which the present invention may be implemented.

FIG. 5 is a schematic diagram of a host computer system in which the preferred embodiment of the present invention is implemented. As can be seen, the host computer system includes a host CPU 50 which is coupled to a host bus 51. Also, a host memory 52 is included connected to the host bus. The architecture further includes a mass storage device 53, such as a disk drive connected to the host bus 51. Add-on devices, such as display control 54, network interface 55, and other add-on device 56 are also coupled to the host bus 51. The network interface 55 in the preferred system is coupled to an Ethernet network. The preferred embodiment of the present invention provides a method for optimizing a device driver for the network interface 55 for an Ethernet network, according to the NDIS standard.

Two primary goals of the present invention are to create the fastest possible code for a host variant architecture and to occupy the smallest amount of host memory. Both of these goals are met through the use of the relocatable code blocks technique outlined above. In the preferred system, the technique is used for generating a driver for the NDIS industry standard network interface. Such a driver requires certain functional blocks in all of the host variant architectures. For example, one functional block is the TransmitChain procedure. In the initialization module, several different versions of the TransmitChain procedure are stored in a TransmitChain segment. One version is written for a 286 environment, one for a 386 environment, and so on. During initialization, the device driver determines its environment and selects the appropriate TransmitChain procedure for that environment. The selected procedure is then moved to the beginning of the TransmitChain segment. The rest of the TransmitChain procedures which were not appropriate for this environment are overwritten or discarded when the device driver returns from initialization.

This relocatable code block technique is implemented in the preferred system in all of the performance critical device driver code. That is, all code except for code in the SupportCode segment is implemented in this technique. Thus, many different versions of the performance critical routines are written so as to provide optimal performance and minimal size for almost any host variant architecture.

The resulting device driver, after initialization, will include the following blocks of code:
SupportCode
TransmitChain
TransferData
ISREntry/RCSComplete
XmitComplete
IndicationComplete/ISRExit
IndicationOn/IndicationOff Thus, with the exception of the SupportCode block, a functional segment, including a plurality of code blocks optimized for a particular application is provided for each of the six remaining functions.

It can be seen that a restriction must be imposed on jumps and calls that are performed in these blocks. No instruction pointer-relative jumps or calls may be made between relocatable code blocks. In order for code in one code block to call a procedure in another code block, an indirect jump through a variable in the data segment must be done. This will load the instruction pointer with an absolute offset from the beginning of the code set, not a relative offset.

Figure 6A:
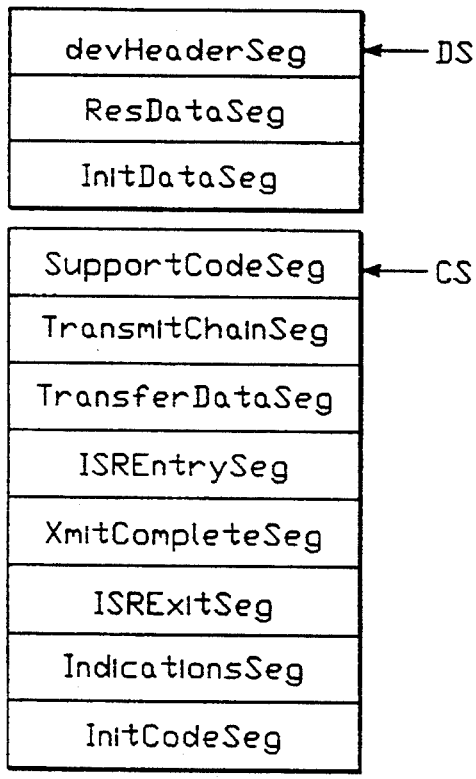
FIG. 6A is a block diagram of an initialized module for OS/2 operating system environments.
Figure 6B:
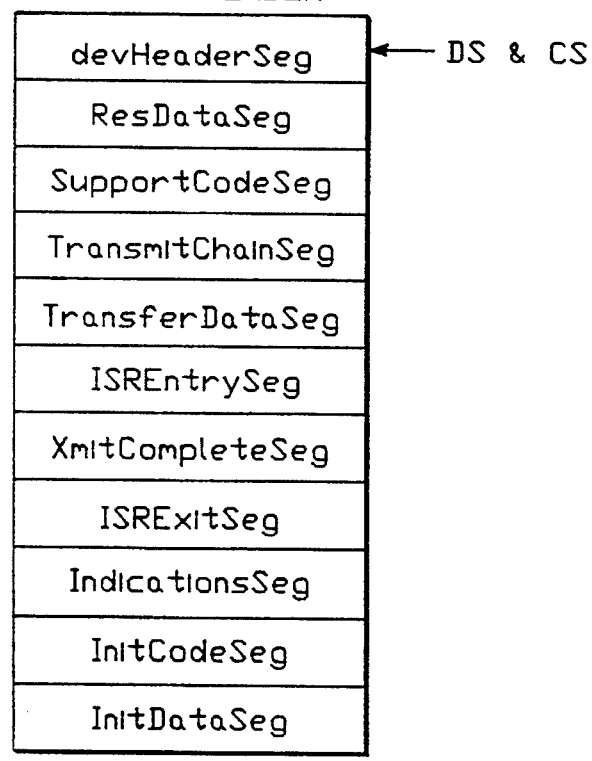
FIG. 6B is a block diagram of the initialization module for DOS operating system environments.

The structure of the functional segments is illustrated in FIG. 6A for an OS/2 environment and FIG. 6B for a DOS environment.

Thus, in the OS/2 environment, the data segments, including devHeaderSeg, ResDataSeg, and InitDataSeg are loaded in a data portion of host memory pointed to by a data segment selector DS. The functional code segments are loaded in the SupportCodeSeg, TransmitChainSeg, TransferDataSeg, ISREntrySeg, XmitCompleteSeg, ISRExitSeg, IndicationsSeg, and InitCodeSeg, and are pointed to by a code segment selector pointer CS. In the DOS environment, the order of the segments is somewhat different because the data and code segments are not partitioned within the memory. Thus, in the DOS environment, as illustrated in FIG. 6B, the order of segments is as follows: devHeaderSeg, ResDataSeg, SupportCodeSeg, TransmitChainSeg, ISREntrySeg, TransmitCompleteSeg, ISRExitSeg, IndicationsSeg, InitCodeSeg, InitDataSeg.

As mentioned above, when the device driver is first loaded in the memory, each of the performance critical program segments is composed of at least one code block, each code block is optimized for one or more particular variant architectures, within which the device driver is intended to run.

Figure 7:
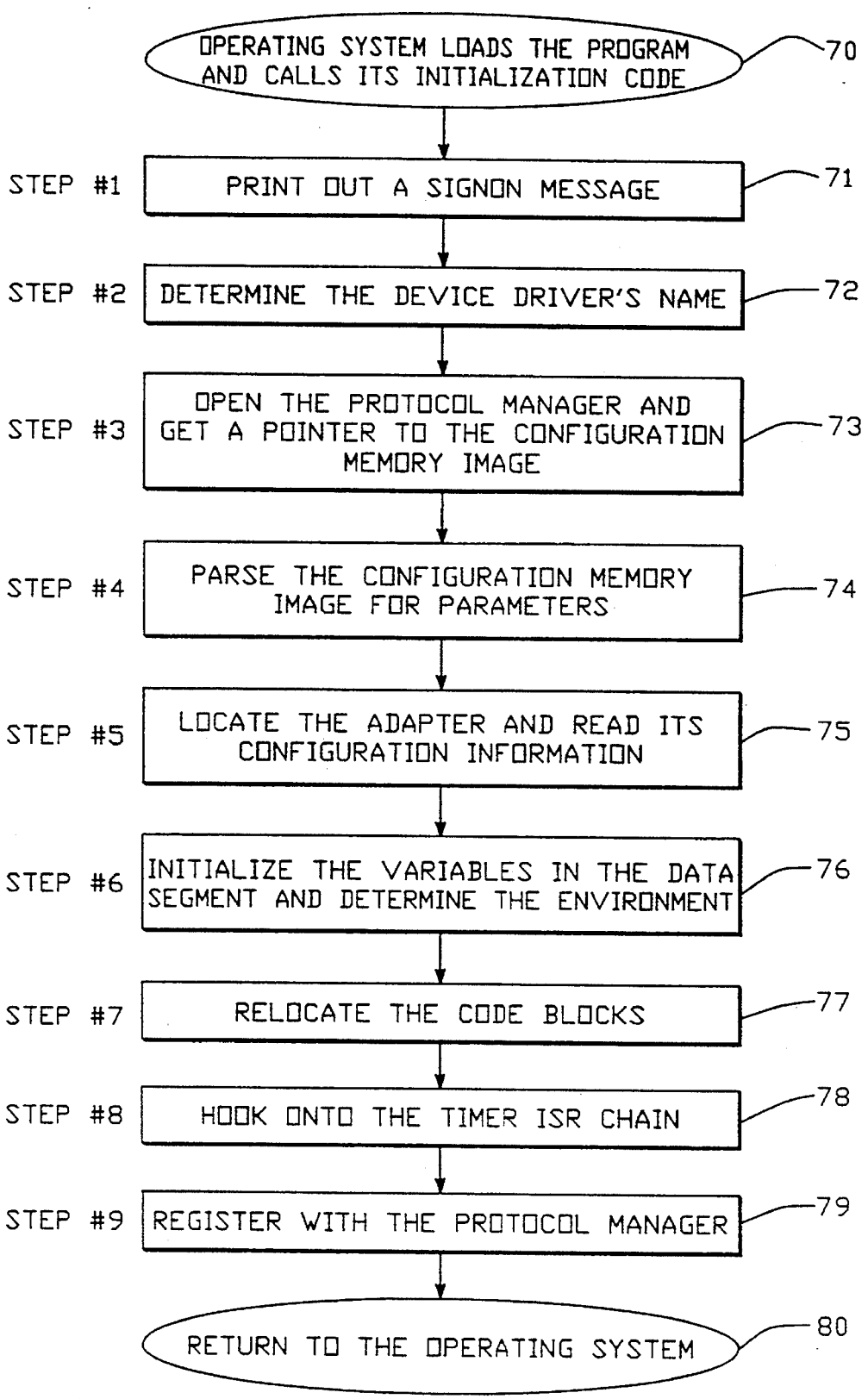
FIG. 7 is a flow chart of the initialization process according to a preferred embodiment of the present invention.

The initialization process for this preferred embodiment is illustrated in FIG. 7. It begins when the operating system reads the program image of the device driver from a secondary storage device and loads it into memory. The operating system then branches to the initialization code of the program, InitCodeSeg, which has been loaded into memory.

The initialization process includes the nine steps illustrated in FIG. 7.

As mentioned above, the process begins by loading the program and calling the initialization code (block 70). The first step involves printing a message on the display terminal identifying the software which is being initialized (block 71). Next, the device driver searches for an unused device driver name among all other device drivers which have been loaded (block 72). In the third step, the protocol manager is opened to obtain a pointer to a configuration memory image, if such configuration memory exists (block 73). Next, the configuration memory image is parsed to identify key words and parameters that inform the device driver of the host architecture (block 74).

In step 5, the expansion slots of the host computer are scanned for an adapter which will be controlled by this device driver. Once found, the adapter's configuration information is read (block 75). In step 6, the variables which could not be initialized at compile time are now initialized and code is executed which determines the device driver's host environment (block 76).

In step 7, the code blocks are selected and relocated, possibly by overwriting code blocks which are not needed. The data structures which were initialized at compile time and in step 6 (block 76) are used to guide the relocation process. The host environment which was determined in steps 4 (block 74) and 6 (block 76) is also used to guide the selection and relocation process (block 77). In step 8, the device drivers timer interrupt service routine is registered so that it will be called during each timer tick (block 78). In step 9, the device driver informs the protocol manager that it has been initialized and is able to bind with other modules in the system (block 79). Finally, the control returns to the host operating system (block 80).

As mentioned above, part of the initialization process is to scan the configuration memory image for key words and parameters (block 74). The configuration memory image, or CMI, is a structure in memory created by the protocol manager in DOS or OS/2 type systems. The protocol manager loads before the device driver of the present invention and creates the configuration memory image. The key words and parameters found in the CMI help the device driver determine its environment.

Figure 8:
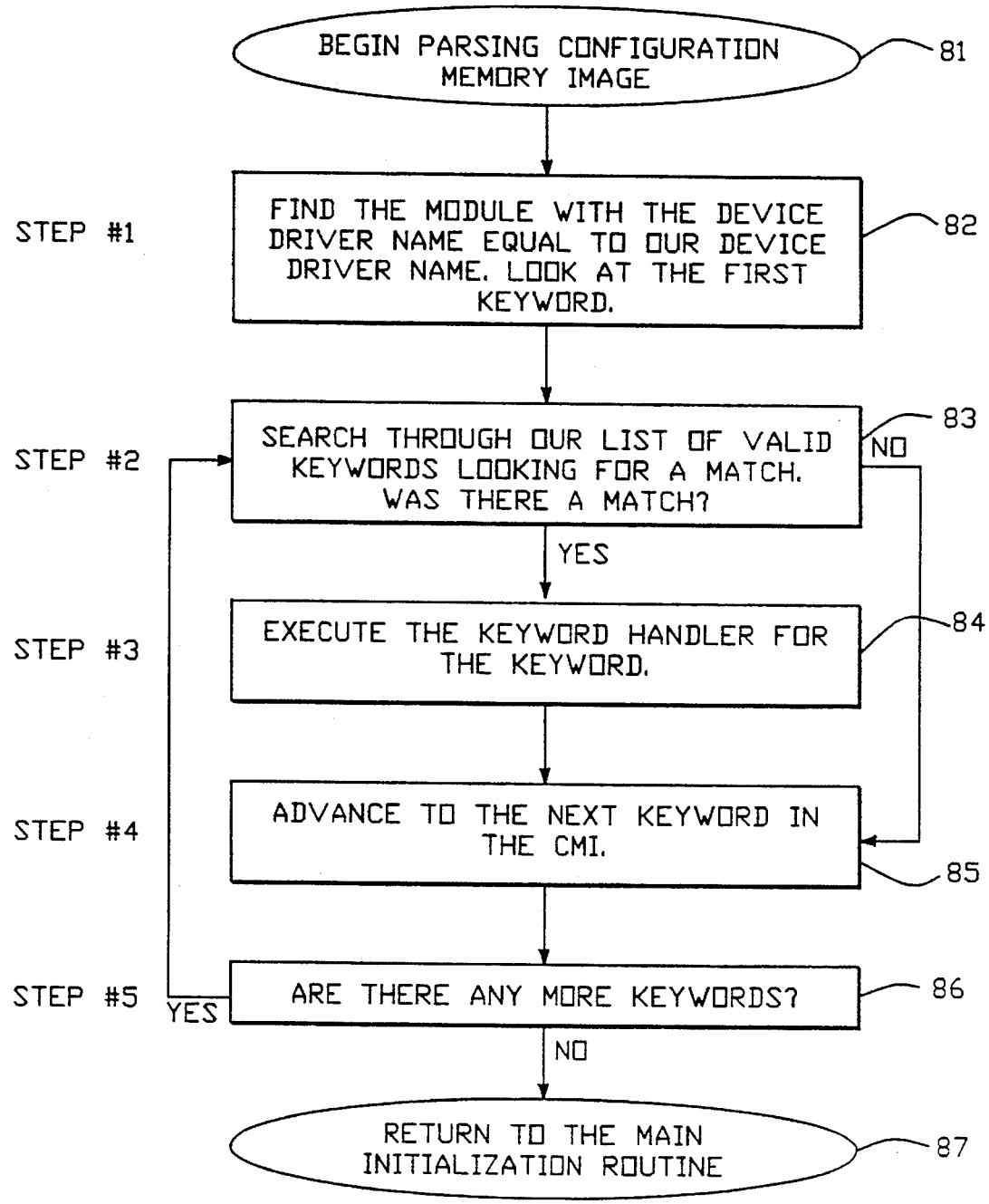
FIG. 8 is a flow chart of one portion of the initialization code for parsing a configuration memory image in a preferred embodiment of the present invention.

The process for parsing the configuration image is illustrated in FIG. 8. The algorithm begins at parsing the configuration memory image (block 81). In step 1, the configuration memory image structure is scanned, starting with the first module. If a module is found which contains the key word DRIVERNAME, and a parameter equal to our device driver name, then we begin examining the key words of that module, starting with the first key word (block 82). In the second step, the key word is compared against a list of valid key words. If a match is found, then the algorithm branches to step 3, otherwise, the algorithm branches to step 4 (block 83). In step 3, a procedure is called to validate the parameters of the key word and set the environment variable according to the parameters of the key word (block 84). In step 4, the program advances to the next key word in the CMI (block 85).

In step 5, if there are no more key words, then the routine returns to the main initialization routine, otherwise the process loops to step 2 (block 86). Finally, the routine returns to the main initialization module (block 87).

As mentioned above, a given host architecture may or may not include a configuration memory, or the configuration memory may not include enough information upon which the host architecture can be unambiguously identified. Thus, the part of the initialization process, as illustrated in FIG. 7, involves executing tests to determine the host environment. In the first system, two aspects of the environment are automatically determined. The CPU type of the host machine, and whether or not the device driver can perform virtual to physical address translations under the OS/2 operating system.

Figure 9:
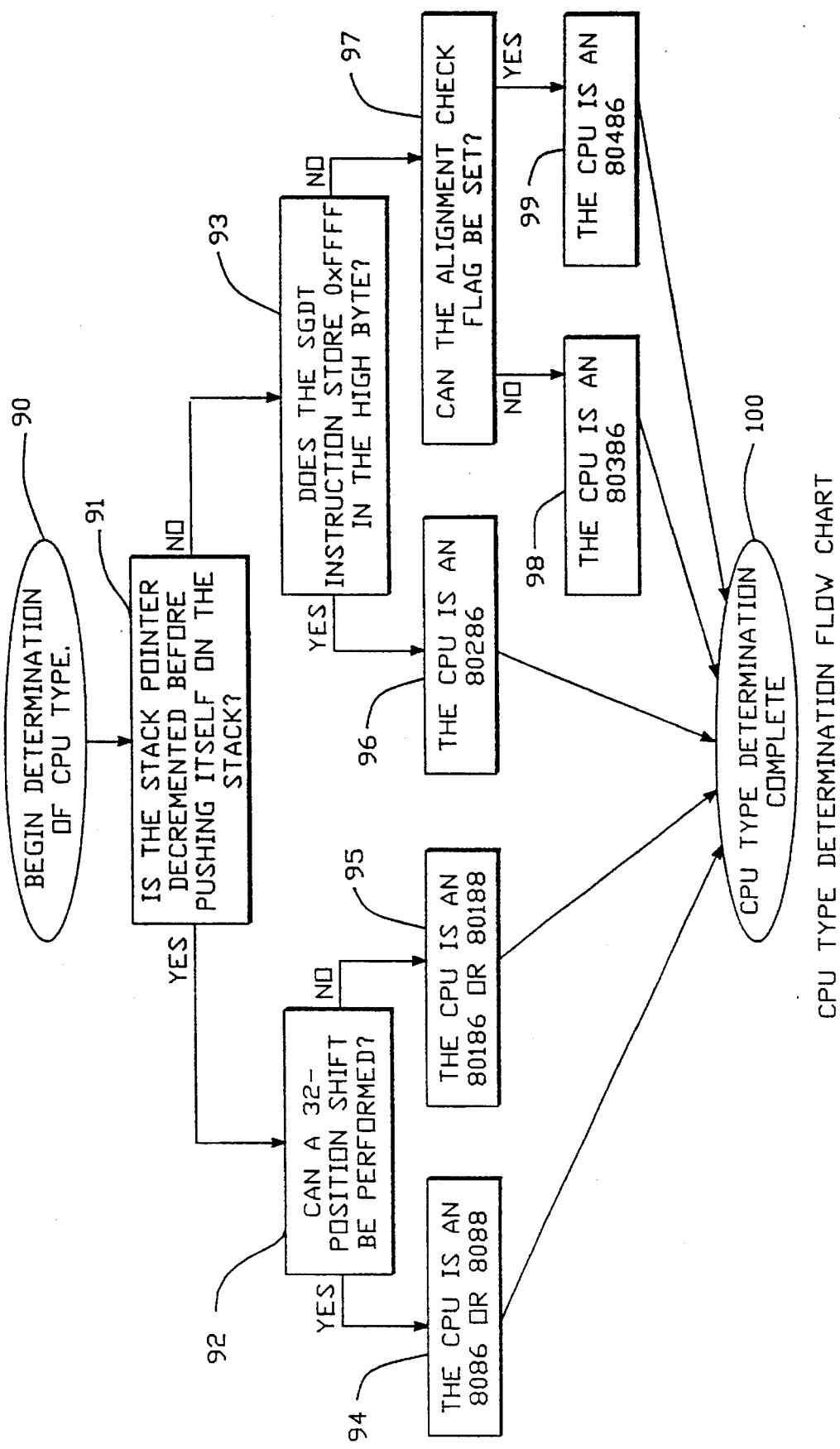
FIG. 9 is a flow chart for determining a host CPU type according to one embodiment of the present invention.

The flow chart for running these tests is illustrated in FIG. 9. Thus, as mentioned above, a determination of the CPU type is begun at block 90.

First test is to determine whether the stack pointer is decremented before pushing itself onto the stack, or not (block 91). If the stack pointer is decremented before pushing, then the test is performed to determine whether a 32-position shift can be performed (block 92). If the stack pointer is not decremented before pushing, then a test is performed to determine whether the SGDT instruction stores OXFFFF in the high byte (block 93).

From block 92, if a 32-position shift can be performed, it is determined that the CPU is an 8086 or an 8088 (block 94). If a 32-position shift cannot be performed, then the CPU is an 80186 or 80188 (block 95). From block 93, if it is determined that the SGDT instruction stores OXFFFF in the high byte, then the CPU is an 80286 (block 96). Otherwise, a test is performed to determined whether an alignment check flag can be set (block 97).

If the alignment flag cannot be set, then the CPU is an 80386 (block 98). Otherwise, the CPU is an 80486 (block 99). Once the CPU type is determined, this algorithm is completed (block 100).

Figure 10:
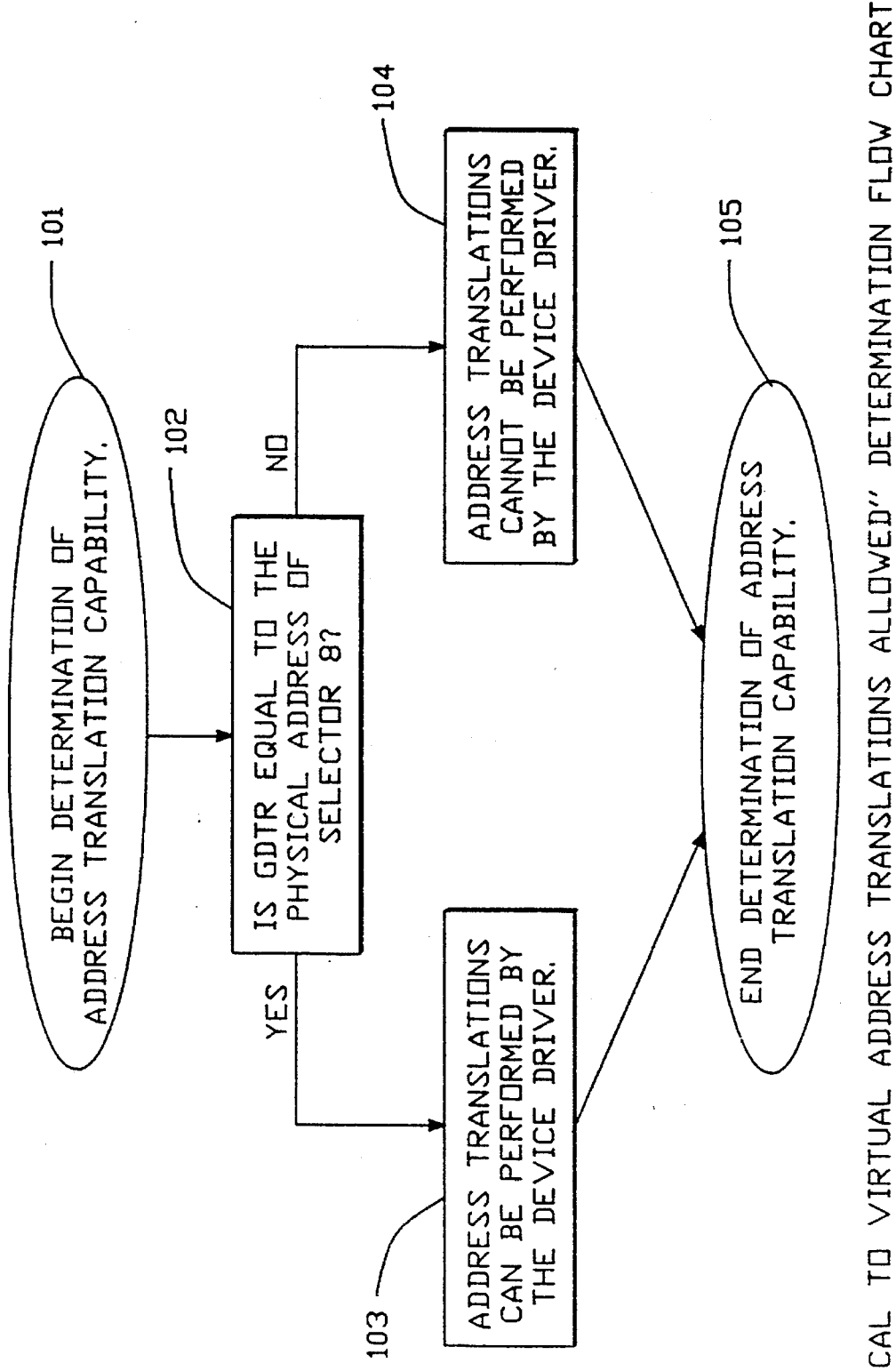
FIG. 10 is a flow chart for determining whether physical to virtual address translation is allowed in the host data processing system according to a preferred embodiment of the present invention.

The algorithm for determining whether virtual address translations are allowed in the OS/2 environment is illustrated in FIG. 10. It begins at block 101 where a determination of address translation capability is called. This is determined by determining whether the GDTR is equal to the physical address of selector 8 at block 102. If the GDTR is equal to the physical address of selector 8, then address translations can be performed by the device driver (block 103). Otherwise, address translations cannot be performed by the device driver (block 104). This ends the determination of address translation capability (block 105).

Figure 11:
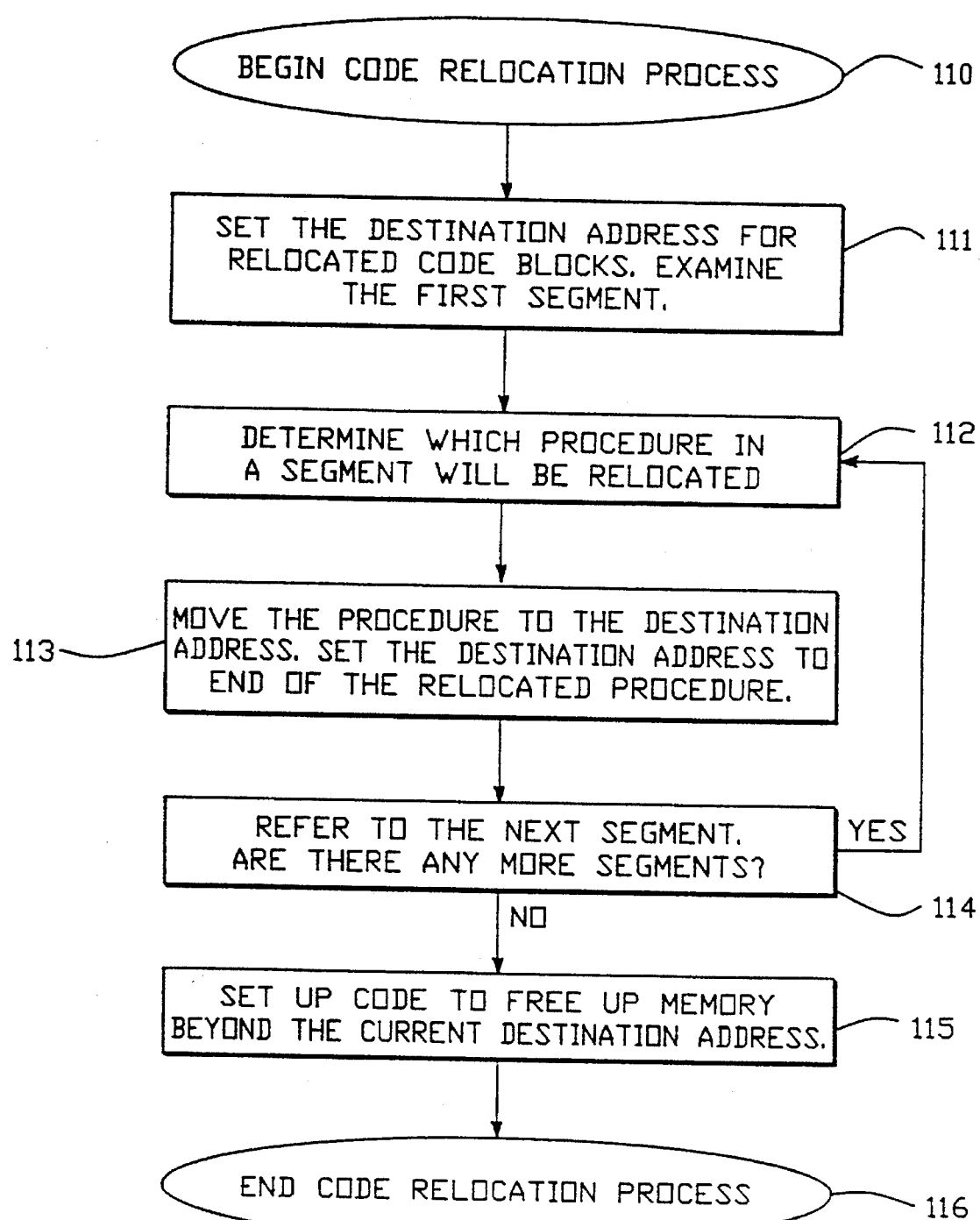
FIG. 11 is a flow chart illustrating the relocation of code blocks according to one embodiment of the present invention.

Once the variant architecture of the host data processing system is determined, the relocation process may begin. This process is illustrated in FIG. 11. As shown, the code relocation process begins at block 110. The first step involves setting the destination address for relocated code blocks and examining the first functional segment (block 111). Next, it is determined which procedure code block in the segment will be relocated (block 112). The procedure code block is then moved to the destination address and the destination address is set to the end of the relocated procedure code block (block 113). Next, reference is made to the next segment if there are more segments to be reviewed (block 114). If there are more code blocks, then the algorithm loops to block 112. Otherwise, the process sets up codes to free up memory beyond the current destination address (block 115), which has been set in block 113 at the end of the last relocated procedure code block. This represents the end of the relocation process (block 116).

In the preferred system, the relocation technique is implemented using a machine environment variable and several tables. The machine environment variable is illustrated in FIG. 12. It includes a bit mask that defines the host variant architecture. All of the information that is needed to select which code block will be relocated is contained in this variable. It is stored in the ResDataSegment. The variable is compiled with a value of all zeros. The fields in it are set at various points during initialization before code relocation is done and are never changed. The fields in this bit mask variable include:

CPU type at positions 2:0. This field contains a code for the CPU in which the driver is running. The values for this field in the preferred system include:
000 for 8088 or 80886 CPU
001 for 80188 or 80186 CPU
010 for 80286 CPU
011 for 80386 CPU
100 for 80486 CPU Other bit combinations are undefined but can be used for a variety of different CPU processors.

Operating system, bit 3. This field contains a bit that indicates which operating system the device driver is running under. It is cleared for DOS and set for OS/2.

Use DevHelp Calls, bit 4. In the OS/2 environment, this bit signifies whether or not the DevHelp routines will be called in the performance critical routines. If this bit is set, the DevHelp routines will always be called. If the bit is cleared, the driver will execute code that perform the same function as the DevHelp calls which may increase performance. This bit has no meaning in the DOS environments.

AsyncTransferData, bit 5. This bit indicates whether or not an asynchronous transfer data routine is used. At this time, the asynchronous transfer data function is not a defined part of the NDIS standard for which the preferred embodiment is implemented. However, if the bit is set, the transfer data function will operate asynchronously. If it is clear, it will operate synchronously as defined in NDIS V2.0.1.

EarlyReceiveLookAhead, bit 6. This bit indicates whether or not an EarlyReceiveLookAhead function should be called in the protocol. At this time, the EarlyReceiveLookAhead function is not a defined part of the NDIS. If this bit is set, the NDIS driver will call EarlyReceiveLookAhead. If the bit is clear, ReceiveLookAhead will be called.

AllowGDTAddresses, bit 7. This bit determines whether or not the driver will support the use of GDT selectors in the frame descriptors. If this bit is set, then GDT selectors may be used to describe frames (the pointer type field in a data block descriptor may be set to 2). If this bit is clear, then only physical addresses may be used to describe frames. This bit has no meaning for DOS versions of the driver.

The other bits in this 16 bit mask are not used and are always set to zero in the preferred system.

The AsynchTransferData and EarlyReceiveLookAhead functions are optimizations of the NDIS driver, the implementations of which are not important to the present invention. However, their presence in the machine environment variable indicates that this variable can be used for a variety of code optimizations for a given architecture, other than those which are host CPU and operating system dependent.

The relocation code is completely table driven. There are four types of tables illustrated in FIG. 13 which guide the relocation code through its work. These include the master relocation table 140, the index tables 141, the bounds tables 142, and the address tables 143. All of these tables are located in the InitDataSeg segment of the initialization module.

The master relocation table 140 is the main table from which all other tables can be accessed. There is one master relocation table. Each entry in this table corresponds to one functional segment, which includes blocks to be relocated. For example, one entry in this table handles the selection and relocation of the TransmitChain procedure within the TransmitChain segment. The entries in the master relocation table are processed in the order that they appear in the table. Therefore, the first type of code block in the table will be the first code block relocated. The second entry in the table will be placed just after that code block, and so on. The code is relocated to the location at the beginning of the TransmitChain segment. The order of entries in this table must correspond to the order of segment definitions.

The first word 144 in the master relocation table 140 contains the number of entries in the table. For the system indicated above, the number would be 6. However, it is implemented so that it can be an unsigned integer anywhere in the range from 0 to 65535. Each table entry, e.g., 145, contains two words. The first word 145a is an offset to the index table for the functional segment. The second word 145b is an offset from the beginning of the data group to a bounds table for the functional segment. Therefore, each functional segment including blocks to be relocated, such as the TransmitChain, has associated with it an index table 141 and a bounds table 142. The index table 141 and the bounds table 142 allow for the correct code block to be selected and relocated based on the contents of the machine environment variable.

The index table 141 provides a mechanism for mapping the bits of the machine environment variable into an index for the bounds table. Each entry in the master relocation table 140 points to a different index table 141. The index tables are located in the InitDataSeg segment.

The mapping done by the index table allows the bounds table to be smaller than if no mapping were done. There are up to 16 bits in the machine environment variable that can be used to select a code block for relocation. This means that there may be over 65,000 code blocks to choose from when selecting which code block to relocate. To reduce this number to something a little more manageable, the index table forms an index based only on the bits in the machine environment variable which are relevant for this code block type.

For example, there may be two TransmitChain code blocks written: a 286 version and a 386/486 version. To select one of these two code blocks, the relocator determines whether the processor is a 286 or a 386/486. All of the other bits in the machine environment variable can be ignored since they do not affect which code block will be selected. This mapping narrows the number of code blocks that must be selected from over 65,000 to 2. This significantly reduces the size of the bounds table.

The first word 146 in the index table 141 contains a number of entries in the table. This is an unsigned integer that may range from 0 to 65,535. Each entry contains three words. The entries in the index table are processed in the order that they appear in the table, starting with the first entry 147 at offset 02.

The first word 147a of each entry 147 is a bit mask that specifies which bits in the machine environment variable must be set in order for this entry's bounds index field to be used as an index into the bounds table. The second word 147b is a bit mask that specifies which bits in the machine environment variable must be clear in order for this entry's bounds index to be used as an index into the bounds table. The last field 147c in each index table entry 147 is a word which contains an index into the bounds table. This value is used as an index into the bounds table only if both the set and clear conditions specified in the two preceding words are met. Once an entry which meets both the setting and clear conditions is encountered by the relocator, the index into the bounds table specified by that entry is used, and the remaining index table entries are not processed.

Using the TransmitChain example described above, the index table could look as illustrated in FIG. 14. The first word 150 indicates that there are two entries in the table, one for each of the two versions of the TransmitChain procedure identified in the bounds table. The first entry in the index table causes the first entry at index 0 to be selected if bit 1 in the machine environment variable is set and bits 2 and 0 are clear. This selects the 80286 version of the TransmitChain routine. The rest of the machine environment variable bits are ignored.

The second entry at offset 08 in this table causes the second entry in the bounds table at index 1 (0001h) to be selected if bits 1 and 0 in the machine environment variable are set and if bit 2 is clear. This selects the 80386 version of the TransmitChain routine.

The bounds table 142 contains entries which describe a code block. Each entry in the master relocation table points to a different bounds table. The bounds tables are located in the InitDataSeg segment. An index into the bounds table is formed when the corresponding index table is processed as described above. The size of the bounds table, therefore, is determined by the highest value of the bounds index field of the corresponding index table.

Each entry 148 in the bounds table 142 includes three words 148a, 148b, 148c. The first word 148a in each bounds table entry 148 contains an offset from the beginning of the functional segment to an address table 143. Each code block has associated with it an address table as described below. The second word 148b in the bounds table entry 148 is an offset from the beginning of the functional segment code group to the start of the code block 149. The third word 148c in the entry 148 of the bounds table is an offset from the beginning of the functional segment code group to the first byte beyond the end of the code block 149. Thus, the second and third words provide the bounds of the code block. This information is used when moving the code block into lower memory during a relocation process.

The address table 143 contains a list of location dependent entries in the resident data segment that must be modified so that they refer to the appropriate locations in a relocated code block. For example, the entry in the MAC upper dispatch table that contains the address of the TransmitChain routine must be updated to point to the new location of the relocated TransmitChain. Every code block has associated with it an address table. These tables are located in the InitDataSeg segment.

The first word 150 in the address table contains a number of entries in the table. This is an unsigned integer that may range from 0 to 65,535. The address table entries follow this word. Each address table entry 151 includes three words 151a, 151b, 151c. The first word 151a in each address table entry 151 contains an offset from the beginning of the code block. The entry at this offset is pointed to by a variable in a data segment. For example, if the TransmitChain procedure entry point is at offset 1a hex in the code block (as distinguished from the functional segment code group), then 1a hex will be placed in the first word 151a of the entry 151. The second word 151b in each address table entry 151 contains an offset in the functional segment code group to a pointer that points to this code block. The memory location pointed to by this word will be set to the value found by adding the starting location of the relocating code block plus the offset given in the first word 151a of the address table entry 151. The third word 151c in each address table entry 151 contains a flag which specifies whether or not the pointer in the functional segment code group is a near or far pointer. If this word is set true, then a far pointer is assumed to be at that location, and the code segment value will be written along with the offset. If this word is false, then the near pointer is assumed to be at that location, and only the offset is written.

IMPLEMENTING CODE EXAMPLES

The code using these tables and the machine environment variable for the DOS operating system and the OS/2 operating system are representative of the present invention, and are provided below. Also, descriptions of the code blocks in the preferred system are provided.

DOSRelocateCode

Description—This routine is called from the DOSdevInitInterrupt routine. The MachineEnvironment variable and all of the relocation tables guide this code through the relocation process. An outer loop iterates through all of the entries in the master relocation table. Each entry in the index table for the current master relocation table entry is examined in an inner loop. Once an entry is found that matches the configuration of the MachineEnvironment variable the inner loop is terminated and the corresponding entry in the bounds table is processed.

To process the bounds table the first field, which contains the offset to an address table, is used. Each entry in the address table is examined and the appropriate address in the data segment is "fixed-up". The second and third fields in the bounds table are then used to relocate the code block into the new code segment. After the code block has been relocated the next entry in the master relocation table is processed.

---

| | |
|---|---|
| Segment: | InitCodeSeg |
| Inputs: | DS points to the data segment. |
| | MachineEnvironment. All of the bits which affect code relocation must be initialized. |
| | Relocation Tables. The relocation tables must contain the proper values to guide this procedure. |
| Outputs: | Carry flag. If carry is set, then an error occurred. Otherwise, no error. |
| | DX. If an error occurred, DX contains the offset to the error message. |
| | The code segment is modified. |
| | RelocateCodeEnd. This variable is set to the offset from the beginning of the device driver to the byte beyond the last byte of code that was relocated. |
| Interrupt State: | Unchanged. |

Pseudo Code (copyright 1991 3COM Corporation):

```
/*
        Set ES:DI to the starting location where the
        code will be relocated to. This is always the
        start of the TransmitChainSeg segment.
*/
mov     ax,cs                   ; Get the current code segment
mov     es,ax                   ; Store it in ES
mov     di,offset Code:TransmitChainSeg    ; Set DI to
                                              the offset
/*
        In case code relocation has been disabled, set
        the end-of-code marker to the end of the device
        driver code.
*/
mov         RelocateCodeEnd,offset Code:InitCodeSeg
/*
        Initialize the SI register to point to the
        master relocation table. The number of entries
        in the relocation table is stored in the loop
        counter and SI is updated to point to the first
        entry in the master relocation table.
*/
SI =    offset Code:MasterRelocationTable
LoopCounter1 = word ptr [SI]
If      (LoopCounter1 = 0)
        Goto DOSRelocateCodeEnd
SI =    SI + 2
/*
        Each iteration of this loop processes one entry
        in the master relocation table.
*/
ProcessMasterRelocationTable:
/*
        Set BX to point to the Index Table. A loop
        counter is initialized to contain the number of
        entries in the index table.
*/
BX =    [SI].MRTIndexTablePtr
```

-continued

```
LoopCounter2 = word ptr [BX]
BX =    BX + 2
/*
        Each iteration of this loop processes one entry
        in the index table. The loop terminates when
        all of the entries have been processed or an
        entry is found that specifies the correct bits
        set and clear in the machine environment
        variable.
*/
SearchIndexTable:
If      (((MachineEnvironment & [BX].IndexSetBits) ! =
                [BX].IndexSetBits) ||
        ((MachineEnvironment & [BX].IndexClearBits) ! =
                0))
{
        /* Process the next entry. */
        BX = BX + size IndexTableStruc
        Loop SearchIndexTable
        /*
                If we get here, we have encountered a
                serious error. This means that there is
                no code written to handle the current
                machine environment. THIS SHOULD
                NEVER HAPPEN!
        */
        DX = &NoIndexTableEntry
        Set the Carry Flag
        return far
}
/*
        Get the bounds table index from the index
        table. Then set BX to the start of the bounds
        table. DI is aligned on a double word
        boundary.
*/
BoundsIndex = [EX].IndexBoundsIndex      *      size
BoundsTableStruc
BX = [SI].MRTBoundsTablePtr
DI = (DI + size dword − 1) & not (size dword − 1)
/*
        The current BX is saved, and BX is set to the
        start of the address table. A loop counter is
        initialized to the number of elements in the
        address table.
*/
SavedBX = BX
BX = [BX+BoundsIndex].BoundsAddressTablePtr
LoopCounter3 = word ptr [BX]
BX = BX + 2
If (LoopCounter3 = 0)
        Goto RelocateCodeBlock
/*
        Each iteration of this loop processes an entry
        in the address table. The appropriate location
        in the data segment is set to the new
        (relocated) location of the code block.
*/
ProcessAddressTable:
/* Set the new offset */
DS:[[BX].AddressDGroupOffset].off =
        DI + [BX].AddressBlockOffset
/*      If data item is a far pointer, set the code
        segment value. */
If      ([BX.]AddressPointerType == TRUE)
        DS:[[BX].AddressDGroupOffset].segm = ES
/*      Point BX at the next address table entry and go
        process it. */
BX =    BX + size AddressTableStruc
Loop    ProcessAddressTable
/*
        It is now time to actually move the code block.
        The starting address and length is retrieved
        from the bounds table. DS and SI are
        temporarily used to point at the current
        location of the code block.
*/
RelocateCodeBlock:
BX = SavedBX
```

-continued

```
SavedSI = SI
SavedDS = DS
SI = [BX].BoundsStartingOffset
CX = [BX].BoundsEndingOffset − SI
DS = CS
REP             MOVSB
/*
        Restore the DS and SI register values. Loop
        back to the top to process another master
        relocation table entry.
*/
DS = SavedDS
SI = SavedSI + size MasterRelocationStruc
Loop ProcessMasterRelocationTable
/*
        Save the current DI value. DI points to the
        end of the resident code segment.
*/
RelocateCodeEnd = DI
DOSRelocateCodeExit:
Clear Carry Flag
Return
```

OS/2 RelocateCode

Description—This routine is called from the OS2devInitStrategy routine. The MachineEnvironment variable and all of the relocation tables guide this code through the relocation process. An outer loop iterates through all of the entries in the master relocation table. Each entry in the index table for the current master relocation table entry is examined in an inner loop. Once an entry is found that matches the configuration of the MachineEnvironment variable the inner loop is terminated and the corresponding entry in the bounds table is processed.

To process the bounds table, the first field which contains the offset to an address table is used. Each entry in the address table is examined and the appropriate address in the data segment is "fixed-up". The second and third fields in the bounds table are then used to relocate the code block into the new code segment. After the code block has been relocated the next entry in the master relocation table is processed.

| | |
|---|---|
| Segment: | InitCodeSeg |
| Inputs: | DS points to the data segment. MachineEnvironment. All of the bits which affect code relocation must be initialized. Relocation Tables. The relocation tables must contain the proper values to guide this procedure. |
| Outputs: | Carry flag. If carry is set, then an error occurred. Otherwise, no error. DX. If an error occurred, DX contains the offset to the error message. The code segment is modified. RelocateCodeEnd. This variable is set to the offset from the beginning of the device driver to the byte beyond the last byte of code that was relocated. |
| Interrupt State: | Unchanged. |

Pseudo Code (copyright 1991 3COM Corporation):
```
/*
        Set ES:DI to the starting location where the
        code will be relocated to. This is always the
        start of the TransmitChainSeg segment. Under
        OS/2 this is accomplished by converting the
        virtual address of the TransmitChain segment to
        a physical address and then converting it back
        to a virtual address.
```

```
        */
        push    ds          ; Save DS
        DS = CS             ; Set DS:SI to destination
        SI = offset Code:TransmitChainSeg
        DL = DEVHLP_VIRTTOPHYS
        pop     es          ; Get DS value back
        call    es:devHelper
        DS = ES
        CX = 65535          ; Maximum size segment
        DH = 1              ; Store result in ES:DI
        DL = DEVHLP_PHYSTOVIRT
        call devHelper
        /*
                In case code relocation has been disabled, set
                the end-of-code marker to the end of the device
                driver code.
        */
        mov     RelocateCodeEnd,offset Code:InitCodeSeg
        /*
                Initialize the SI register to point to the
                master relocation table. The number of entries
                in the relocation table is stored in the loop
                counter and SI is updated to point to the first
                entry in the master relocation table.
        */
        SI = offset DGROUP:MasterRelocationTable
        LoopCounter1 = word ptr [SI]
        If      (LoopCounter1 = 0)
                Goto DOSRelocateCodeEnd
        SI = SI + 2
        /*
                Each iteration of this loop processes one entry
                in the master relocation table
        */
        ProcessMasterRelocationTable:
        /*
                Set BX to point to the Index Table. A loop
                counter is initialized to contain the number of
                entries in the index table.
        */
        BX = [SI].MRTIndexTablePtr
        LoopCounter2 = word ptr [BX]
        BX = BX + 2
/*
                Each iteration of this loop processes one entry
                in the index table. The loop terminates when
                all of the entries have been processed or an
                entry is found that specifies the correct bits
                set and clear in the machine environment
                variable.
        */
        SearchIndexTable:
        If (    (   (MachineEnvironment & [BX].IndexSetBits) ! =
                    [BX].IndexSetBits ) ||
                (   (MachineEnvironment & [BX].IndexClearBits)
                    ! = 0))
{
        /*      Process the next entry. */
                BX = BX + size IndexTableStruc
                Loop SearchIndexTable
        /*
                If we get here, we have encountered a serious
                error. This means that there is no code
                written to handle the current machine
                environment. THIS SHOULD NEVER HAPPEN!
        */
        DX = &NoIndexTableEntry
        Set the Carry Flag
        return
}
        /*
                Get the bounds table index from the index
                table. Then set BX to the start of the bounds
                table. DI is aligned on a double word
                boundary.
        */
        BoundsIndex = [BX].IndexBoundsIndex    *   size
BoundsTableStruc
        BX =    [SI].MRTBoundsTablePtr
        DI =    (DI + size dword − 1) & not (size dword − 1)
/*
                The current BX is saved, and BX is set to the
                start of the address table. A loop counter is
                initialized to the number of elements in the
                address table.
        */
        SavedBX = BX
        BX = [BX+BoundsIndex].BoundsAddressTablePtr
        LoopCounter3 = word ptr [BX]
        BX = BX + 2
        If      (LoopCounter3 = 0)
                Goto RelocateCodeBlock
        /*
                Each iteration of this loop processes an entry
                in the address table. The appropriate location
                in the data segment is set to the new
                (relocated) location of the code block.
        */
        ProcessAddressTable:
        /* Set the new offset */
        DS: [[BX].AddressDGroupOffset].off =
                DI + [BX].AddressBlockOffset
        /*      If data item is a far pointer, set the code
                segment value.     */
        If ([BX].AddressPointerType == TRUE)
                DS:[[BX]AddressDGroupOffset].segm = ES
        /*      Point BX at the next address table entry and go
                process it. */
        BX =    BX + size AddressTableStruc
        Loop    ProcessAddressTable
        /*
                It is now time to actually move the code block.
                The starting address and length is retrieved
                from the bounds table. DS and SI are
                temporarily used to point at the current
                location of the code block.
        */
        RelocateCodeBlock:
        BX = SavedBX
        SavedSI = SI
        SavedDS = DS
        SI = [BX].BoundsStartingOffset
        CX = [BX].BoundsEndingOffset − SI
        DS = CS
        REP     MOVSB
        /*
                Restore the DS and SI register values. Loop
                back to the top to process another master
                relocation table entry.
        */
        DS = SavedDS
        SI = SavedSI + size MasterRelocationStruc
        Loop ProcessMasterRelocationTable
        /*
                Save the current DI value. DI points to the
                end of the resident code segment.
        */
        RelocateCodeEnd = DI
        OS2RelocateCodeExit:
        Clear Carry Flag
        Return
```

DOS Performance Critical Code

The performance critical code is the code which is used to transmit and receive packets. This includes the TransmitChain, TransferData, the XmitComplete and RcvComplete paths in the interrupt service routine, and the IndicationOn/IndicationOff procedures. These procedures are described below in summary fashion as examples for implementing the invention. There are several versions of each performance critical code section, one of which is selected and relocated during code relocation. These versions are:

TransmitChain - Initiates transmission of a packet
   286
   386
TransferData - Copies a received packet to protocol managed buffers.
   286
   386
IndicationOn/IndicationOff - Enable and disables indications
   286 and 386
ISR Entry and RcvComplete - Processes packet reception
   286
   386
IndicationComplete and ISR Exit - Allows protocol to do post processing
   286
   386
Xmit Complete - Processes transmit completion
   286
   386

DOS 286 TransmitChain Description—This routine initiates the transmission of a packet. It is called by the protocol whenever the protocol wants to transmit a packet. The code in this routine is specifically optimized for the DOS 80286 environment. This routine copies the request handle, protocol id, immediate data count, data block count, immediate data, and the data block descriptors to the adapter.

| Segment: | TransmitChainSeg |
|---|---|
| Inputs: | SS:SP+6 - Our data segment value. |
|  | SS:SP+8 - Pointer to a transmit frame buffer descriptor. |
|  | SS:SP+12 - Request handle. |
|  | SS:SP+14 - Protocol ID. |
|  | XmitAreaPtr - This variable contains a far pointer to the Area register for the adapter controller. |
| Outputs: | AX contains an NDIS return code. |
| Interrupt State: | Disabled in entry and enabled on exit. |

DOS 386 TransmitChain Description—This routine initiates the transmission of a packet. It is called by the protocol whenever the protocol wants to transmit a packet. The code in this routine is specifically optimized for the DOS 80386/ 80486 environment. This routine copies the request handle, protocol id, immediate data count, data block count, immediate data, and the data block descriptors to the adapter.

| Segment: | TransmitChainSeg |
|---|---|
| Inputs: | SS:SP+6 - Our data segment value. |
|  | SS:SP+8 - Pointer to a transmit frame buffer descriptor. |
|  | SS:SP+12 - Request handle. |
|  | SS:SP+14 - Protocol ID. |
|  | AdapterSegment - This variable contains the segment selector of the Adapter RAM. |
| Outputs: | AX contains an NDIS return code. |
| Interrupt State: | Disabled in entry and enabled on exit. |

DOS 286 TransferData Description—This routine copies a received packet to protocol managed buffers. The code in this routine is specifically optimized for the DOS 80286 environment. The number of transfer data blocks, the frame offset, and the transfer data block descriptors are written to the adapter. The transfer is then initiated by reading the XferQueueStatus register and the driver polls until the transfer is complete. When the transfer is complete the status of the transfer is returned to the protocol.

| Segment: | TransferDataSeg |
|---|---|
| Inputs: | SS:SP+6 - Our data segment value. |
|  | SS:SP+8 - Far pointer to a transfer data descriptor. |
|  | SS:SP+12 - Starting offset in frame for transfer. |
|  | SS:SP+14 - Far pointer to a word that contains the number of bytes copied. |
|  | AdapterSegment - Contains the Adapter's RAM segment selector. |
| Outputs: | AX contains an NDIS return code. |
| Interrupt State: | Unchanged. |

DOS 386 TransferData
Description—This routine copies a received packet to protocol managed buffers. The code in this routine has been specifically optimized for the DOS 80386/80486 environment. The number of transfer data blocks, the frame offset, and the transfer data block descriptors are written to the adapter. The transfer is then initiated by reading the xferQueueStatus register and the driver polls until the transfer is complete. When the transfer is complete the status of the transfer is returned to the protocol.

| Segment: | TransferDataSeg |
|---|---|
| Inputs: | SS:SP+6 - Our data segment value. |
|  | SS:SP+8 - Far pointer to a transfer data descriptor. |
|  | SS:SP+12 - Starting offset in frame for transfer. |
|  | SS:SP+14 - Far pointer to a word that contains the number of bytes copied. |
|  | AdapterSegment - Contains the Adapter's RAM segment selector. |
| Outputs: | AX contains an NDIS return code. |
| Interrupt State: | Unchanged. |

DOS IndicationOn
Description—This routine enables indications. The adapter handles the indication counter and the enabling of indications. This routine simply writes to the IndicationOn register in the adapter controller.

| Segment: | IndicationsSeg |
|---|---|
| Inputs: | SS:SP+6 - Our data segment value. |
| Outputs: | AX contains an NDIS return code (always SUCCESS). |
| Interrupt State: | Cleared upon entry and not re-enabled. |

DOS IndicationOff
Description—This routine disables indications. The adapter handles the indication counter and the disabling of indications. This routine simply writes to the IndicationOff register in the adapter controller.

| Segment: | IndicationsSeg |
|---|---|
| Inputs: | SS:SP+6 - Our data segment value. |

-continued

| | |
|---|---|
| Outputs: | AX contains an NDIS return code (always SUCCESS). |
| Interrupt State: | Cleared upon entry and not re-enabled. |

DOS 286 ISREntry

Description—This routine contains the vector interrupt entry point for the adapter interrupt. The code in this routine is specifically optimized for the DOS 80286 environment. The ISREntry code handles the "housekeeping" chores that need to be taken care of before the indication(s) that caused the interrupt can be handled. This routine first checks to see if our adapter generated the interrupt or if we need to chain to another interrupt service routine. Then all of the registers are saved on the stack and we switch stacks to our own private interrupt stack. All adapter interrupts are disabled and system interrupts are re-enabled.

This routine also contains the code to handle a received packet indication. Because this indication is the most common type of indication it is handled as fall-through code. The other indications are handled by branching through a dispatch table. If a received packet caused the indication, the RcvFrameStatus is polled to verify that the packet has been completely received. The LengthLeftThresh register is then modified, if necessary, and ReceiveLookAhead is called. The LookAhead window is then advanced.

A dispatch table is used to branch to the next indication that needs to be handled. If no more indications need to be handled, the dispatch table branches to the code which exits from the interrupt service routine.

| | |
|---|---|
| Segment: | ISREntrySeg |
| Inputs: | None. |
| Outputs: | DS is set to the Adapter's RAM segment selector. |
| Interrupt State: | Disabled on entry and enabled on exit. |

DOS 386 ISREntry

Description—This routine contains the vector interrupt entry point for the adapter interrupt. The code in this routine is specifically optimized for the DOS 80386/80486 environment. The ISREntry code handles the "housekeeping" chores that need to be taken care of before the indication(s) that caused the interrupt can be handled. This routine first checks to see if our adapter generated the interrupt or if we need to chain to another interrupt service routine. Then all of the registers are saved on the stack and we switch stacks to our own private interrupt stack. All adapter interrupts are disabled and system interrupts are re-enabled.

This routine also contains the code to handle a received packet indication. Because this indication is the most common type of indication it is handled as fall-through code. The other indications are handled by branching through a dispatch table. If a received packet caused the indication the RcvFrameStatus is polled to verify that the packet has been completely received. The LengthLeftThresh register is then modified, if necessary, and ReceiveLookAhead is called. The SlapStick LookAhead window is then advanced.

A dispatch table is used to branch to the next indication that needs to be handled. If no more indications need to be handled, the dispatch table branches to the code which exits from the interrupt service routine.

| | |
|---|---|
| Segment: | ISREntrySeg |
| Inputs: | None. |
| Outputs: | DS is set to the Adapter's RAM segment selector. |
| Interrupt State: | Disabled on entry and enabled on exit. |

DOS 286 XmitComplete

Description—This routine is called through the PrimaryIntDispatch or SecondaryIntDispatch table when an XmitComplete indication occurs. This code is specifically optimized for the DOS 80286 environment. This routine adjusts the XmitCompleteThresh register, if necessary, and calls the protocol's transmit confirm procedure.

A dispatch table is used to branch to the next indication that needs to be handled. If no more indications need to be handled, the dispatch table branches to the code which exits from the interrupt service routine.

| | |
|---|---|
| Segment: | XmitCompleteSeg |
| Inputs: | DS is set to the Adapter's RAM segment selector. |
| Outputs: | None. |
| Interrupt State: | Unknown on entry and unchanged. |

DOS 386 XmitComplete

Description—This routine is called through the PrimaryIntDispatch or SecondaryIntDispatch table when an XmitComplete indication occurs. This code is specifically optimized for the DOS 80386/80486 environment. This routine adjusts the XmitCompleteThresh register, if necessary, and calls the protocol's transmit confirm procedure.

A dispatch table is used to branch to the next indication that needs to be handled. If no more indications need to be handled, the dispatch table branches to the code which exits from the interrupt service routine.

| | |
|---|---|
| Segment: | XmitCompleteSeg |
| Inputs: | DS is set to the Adapter's RAM segment selector. |
| Outputs: | None. |
| Interrupt State: | Unknown on entry and unchanged. |

DOS 286 ISRExit

Description—This routine is branched to through the PrimaryIntDispatch or the SecondaryIntDispatch table. This routine is optimized for the DOS 80286 environment. The purpose of this routine is to call indication complete, if necessary, and return from the interrupt context.

| | |
|---|---|
| Segment: | ISRExitSeg |
| Inputs: | DS contains the adapter's RAM segment selector. |
| Outputs: | None. |
| Interrupt State: | Cleared on entry, enabled if IndicationComplete is called, enabled when the IRET instruction is executed. |

DOS 386 ISRExit

Description—This routine is branched to through the PrimaryIntDispatch or the SecondaryIntDispatch table. This routine has been optimized for the DOS 80386/80486 environment. The purpose of this routine is to call indication complete, if necessary, and return from the interrupt context.

| Segment: | ISRExitSeg |
|---|---|
| Inputs: | DS contains the adapter's RAM segment selector. |
| Outputs: | None. |
| Interrupt State: | Cleared on entry, enabled if IndicationComplete is called, enabled when the IRET instruction is executed. |

DOS OtherIndication

Description—This routine is called from the other indication handlers through the PrimaryIntDispatch or the SecondaryIntDispatch table. The purpose of this routine is to handle an OtherIndication indication (bit 5 in the IndicationComplete register). The OtherIndication may be caused by one of three events.

First, when the protocol has requested that an interrupt be generated this indication is generated. This routine calls the protocol's interrupt status indication.

Second, when the protocol has requested that the MAC driver be reset this indication is generated. This routine calls the StartReset and Endreset status indications, and performs the actual reset of the adapter and the MAC driver.

The third reason this indication may be generated is when the transmitter encounters a DMA underrun error. This is caused when the adapter is transmitting a packet on the network faster than the bus master can load the packet data onto the adapter. In this case, the XmitStartThresh register is increased to allow more data to be resident on the adapter before a transmit begins.

| Segment: | SupportCodeSeg |
|---|---|
| Inputs: | DS contains the adapter's RAM segment selector. |
| Outputs: | None. |
| Interrupt State: | Unknown on entry and may be enabled. |

OS/2 PERFORMANCE CRITICAL CODE

There are several versions of each performance critical code section, one of which is selected and relocated during code relocation. These versions for the OS/2 environment include:

TransmitChain - Initiates transmission of a packet
   286, No GDT allowed
   386, No GDT allowed
   286, GDT allowed
   386, GDT allowed
TransferData - Copies a received packet to protocol managed buffers
   286, No GDT allowed
   386, No GDT allowed
   286, GDT allowed
   386, GDT allowed
IndicationOn/IndicationOff - Enables and disables indications.
   286 and 386 version
ISR Entry and RcvComplete - Processes packet reception
   286, No DevHlp
   286, DevHlp
   386, do DevHlp
   386, DevHlp
Indication Complete and ISR Exit - Allows protocol to do post processing
   286
   386
XmitComplete - Processes transmit completion
   286
   386

OS/2 286 NoGDT TranSmitChain

Description—This routine initiates the transmission of a packet. It is called by the protocol whenever the protocol wants to transmit a packet. The code in this routine is specifically optimized for the OS/2 80286 environment when GDT addresses are not allowed for data buffer descriptors. This routine copies the request handle, protocol id, immediate data count, data block count, immediate data, and the data block descriptors to the adapter.

| Segment: | TransmitChainSeg |
|---|---|
| Inputs: | SS:SP+6 - Our data segment value. |
| | SS:SP+8 - Pointer to a transmit frame buffer descriptor. |
| | SS:SP+12 - Request handle. |
| | SS:SP+14 - Protocol ID. |
| | XmitAreaPtr - This variable contains a far pointer to the XmitArea register. |
| Outputs: | AX contains an NDIS return code. |
| Interrupt State: | Disabled in entry and enabled on exit. |

OS/2 386 NoGDT TransmitChain

Description—This routine initiates the transmission of a packet. It is called by the protocol whenever the protocol wants to transmit a packet. The code in this routine is specifically optimized for the OS/2 80386/80486 environment when GDT addresses are not allowed for data buffer descriptors. This routine copies the request handle, protocol id, immediate data count, data block count, immediate data, and the data block descriptors to the adapter.

| Segment: | TransmitChainSeg |
|---|---|
| Inputs: | SS:SP+6 - Our data segment value. |
| | SS:SP+8 - Pointer to a transmit frame buffer descriptor. |
| | SS:SP+12 - Request handle. |
| | SS:SP+14 - Protocol ID. |
| | SegmentSelector - This variable contains the segment selector of the Adapter RAM. |
| Outputs: | AX contains an NDIS return code. |
| Interrupt State: | Disabled in entry and enabled on exit. |

OS/2 286 GOT TransmitChain

Description—This routine initiates the transmission of a packet. It is called by the protocol whenever the protocol wants to transmit a packet. The code in this routine is specifically optimized for the OS/2 80286 environment when GDT addresses are allowed for data buffer descriptors. This routine copies the request handle, protocol id, immediate data count, data block count, immediate data, and the data block descriptors to the adapter.

| | |
|---|---|
| Segment: | TransmitChainSeg |
| Inputs: | SS:SP+6 - Our data segment value. |
| | SS:SP+8 - Pointer to a transmit frame buffer descriptor. |
| | SS:SP+12 - Request handle. |
| | SS:SP+14 - Protocol ID. |
| | XmitAreaPtr - This variable contains a far pointer to the XmitArea register. |
| Outputs: | AX contains an NDIS return code. |
| Interrupt State: | Disabled in entry and enabled on exit. |

OS/2 386 GDT TransmitChain

Description—This routine initiates the transmission of a packet. It is called by the protocol whenever the protocol wants to transmit a packet. The code in this routine is specifically optimized for the OS/2 80386/80486 environment when GDT addresses are allowed for data buffer descriptors. This routine copies the request handle, protocol id, immediate data count, data block count, immediate data, and the data block descriptors to the adapter.

| | |
|---|---|
| Segment: | TransmitChainSeg |
| Inputs: | SS:SP+6 - Our data segment value. |
| | SS:SP+8 - Pointer to a transmit frame buffer descriptor. |
| | SS:SP+12 - Request handle. |
| | SS:SP+14 - Protocol ID. |
| | SegmentSelector - This variable contains the segment selector of the Adapter RAM. |
| Outputs: | AX contains an NDIS return code. |
| Interrupt State: | Disabled in entry and enabled on exit. |

OS/2 286 NoGDT TransferData

Description—This routine copies a received packet to protocol managed buffers. The code in this routine has been specifically optimized for the OS/2 environment when GDT selectors are not allowed in data buffer descriptors. The number of transfer data blocks, the frame offset, and the transfer data block descriptors are written to the adapter. The transfer is then initiated by reading the xferQueueStatus register ad the driver polls until the transfer is complete. When the transfer is complete the status of the transfer is returned to the protocol.

| | |
|---|---|
| Segment: | TransferDataSeg |
| Inputs: | SS:SP+6 - Our data segment value. |
| | SS:SP+8 - Far pointer to a transfer data descriptor. |
| | SS:SP+12 - Starting offset in frame for transfer. |
| | SS:SP+14 - Far pointer to a word that contains the number of bytes copied. |
| | SegmentSelector - Contains the Adapter's RAM segment selector. |
| Outputs: | AX contains an NDIS return code. |
| Interrupt State: | Unchanged. |

OS/2 386 NoGDT TransferData

Description—This routine copies a received packet to protocol managed buffers. The code in this routine has been specifically optimized for the OS/2 80386/80486 environment when GDT selectors are not allowed in data buffer descriptors. The number of transfer data blocks, the frame offset, and the transfer data block descriptors are written to the adapter. The transfer is then initiated by reading the XferQueueStatus register and the driver polls until the transfer is complete. When the transfer is complete the status of the transfer is returned to the protocol.

| | |
|---|---|
| Segment: | TransferDataSeg |
| Inputs: | SS:SP+6 - Our data segment value. |
| | SS:SP+8 - Far pointer to a transfer data descriptor. |
| | SS:SP+12 - Starting offset in frame for transfer. |
| | SS:SP+14 - Far pointer to a word that contains the number of bytes copied. |
| | SegmentSelector - Contains the Adapter's RAM segment selector. |
| Outputs: | AX contains an NDIS return code. |
| Interrupt State: | Unchanged. |

OS/2 286 GDT TransferData

.Description—This routine copies a received packet to protocol managed buffers. The code in this routine is specifically optimized for the OS/2 80286 environment when GDT selectors are allowed in data buffer descriptors. The number of transfer data blocks, the frame offset, and the transfer data block descriptors are written to the adapter. The transfer is then initiated by reading the XferQueueStatus register and the driver polls until the transfer is complete. When the transfer is complete the status of the transfer is returned to the protocol.

| | |
|---|---|
| Segment: | TransferDataSeg |
| Inputs: | SS:SP+6 - Our data segment value. |
| | SS:SP+8 - Far pointer to a transfer data descriptor. |
| | SS:SP+12 - Starting offset in frame for transfer. |
| | SS:SP+14 - Far pointer to a word that contains the number of bytes copied. |
| | SegmentSelector - Contains the Adapter's RAM segment selector. |
| Outputs: | AX contains and NDIS return code. |
| Interrupt State: | Unchanged. |

OS/2 386 GDT TransferData

Description—This routine copies a received packet to protocol managed buffers. The code in this routine is specifically optimized for the OS/2 80386/80486 environment when GDT selectors not allowed in data buffer descriptors. The number of transfer data blocks, the frame offset, and the transfer data block descriptors are written to the adapter. The transfer is then initiated by reading the XferQueueStatus register and the driver polls until the transfer is complete. When the transfer is complete the status of the transfer is returned to the protocol.

| | |
|---|---|
| Segment: | TransferDataSeg |
| Inputs: | SS:SP+6 - Our data segment value. |
| | SS:SP+8 - Far pointer to a transfer data descriptor. |
| | SS:SP+12 - Starting offset in frame for transfer. |
| | SS:SP+14 - Far pointer to a word that contains the number of bytes copied. |
| | SegmentSelector - Contains the Adapter's RAM segment selector. |

| | |
|---|---|
| Outputs: | AX contains an NDIS return code. |
| Interrupt State: | Unchanged. |

OS/2 IndicationOn

Description—This routine enables indications. The adapter handles the indication counter and the enabling of indications. This routine simply writes to the IndicationOn register of the adapter controller.

| | |
|---|---|
| Segment: | IndicationSeg |
| Inputs: | SS:SP+6 - Our data segment value. SegmentSelector - Contains the adapter's RAM segment selector. |
| Outputs: | AX contains an NDIS return code (always SUCCESS). |
| Interrupt State: | Cleared upon entry and not re-enabled. |

OS/2 IndicationOff

Description—This routine disables indications. The adapter handles the indication counter and the disabling of indications. This routine simply writes to the IndicationOff register of the adapter controller.

| | |
|---|---|
| Segment: | IndicationsSeg |
| Inputs: | SS:SP+6 - Our data segment value. SegmentSelector - Contains the adapter's RAM segment selector. |
| Outputs: | AX contains an NDIS return code (always SUCCESS). |
| Interrupt State: | Cleared upon entry and not re-enabled. |

OS/2 286 NoDevHlp ISREntry

Description—This routine contains the interrupt entry point for the adapter interrupt. The code in this routine is specifically optimized for the OS/2 80286 environment when DevHelp calls should be avoided. The ISREntry code handles the "housekeeping" chores that need to be taken care of before the indication(s) that caused the interrupt can be handled. This routine first checks to see if our adapter generated the interrupt or if we need to chain to another interrupt service routine. All adapter interrupts are disabled and system interrupts are re-enabled.

This routine also contains the code to handle a received packet indication. Because this indication is the most common type of indication it is handled as fall-through code. The other indications are handled by branching through a dispatch table. If a received packet caused the indication the RcvFrameStatus is polled to verify that the packet has been completely received. The LengthLeftThresh register is then modified, if necessary, and ReceiveLookAhead is called. The LookAhead window is then advanced.

A dispatch table is used to branch to the next indication that needs to be handled. If no more indications need to be handled, the dispatch table branches to the code which exists from the interrupt service routine.

| | |
|---|---|
| Segment: | ISREntrySeg |
| Inputs: | DS is set to the driver's data segment selector. |
| Outputs: | ES is set to the Adapter's RAM segment selector. |
| Interrupt State: | Disabled on entry and enabled on exit. |

OS/2 386 NoDevHlp ISREntry

Description—This routine contains the interrupt entry point for the adapter interrupt. The code in this routine is specifically optimized for the OS/2 80386/80486 environment when devHelp calls should be avoided. The ISREntry code handles the "housekeeping" chores that need to be taken care of before the indication(s) that caused the interrupt can be handled. This routine first checks to see if our adapter generated the interrupt or if we need to chain to another interrupt service routine. All adapter interrupts are disabled and system interrupts are re-enabled.

This routine also contains the code to handle a received packet indication. Because this indication is the most common type of indication it is handled as fall-through code. The other indications are handled by branching through a dispatch table. If a received packet caused the indication the RcvFrameStatus is polled to verify that the packet has been completely received. The LengthLeftThresh register is then modified, if necessary, and ReceiveLookAhead is called. The LookAhead window is then advanced.

A dispatch table is used to branch to the next indication that needs to be handled. If no more indications need to be handled, the dispatch table branches to the code which exits from the interrupt service routine.

| | |
|---|---|
| Segment: | ISREntrySeg |
| Inputs: | DS is set to the driver's data segment selector. |
| Outputs: | ES is set to the Adapters RAM segment selector. |
| Interrupt State: | Disabled on entry and enabled on exit. |

OS/2 286 DevHlp ISREntry

Description—This routine contains the interrupt entry point for the adapter interrupt. The code in this routine has been specifically optimized for the OS/2 80286 environment when devHelp calls should always be called. The ISREntry code handles the "housekeeping" chores that need to be taken care of before the indication(s) that caused the interrupt can be handled. This routine first checks to see if our adapter generated the interrupt or if we need to chain to another interrupt service routine. All adapter interrupts are disabled and system interrupts are re-enabled.

This routine also contains the code to handle a received packet indication. Because this indication is the most common type of indication it is handled as fall-through code. The other indications are handled by branching through a dispatch table. If a received packet caused the indication the RcvFrameStatus is polled to verify that the packet has been completely received. The LengthLeftThresh register is then modified, if necessary, and ReceiveLookAhead is called. The LookAhead window is then advanced.

A dispatch table is used to branch to the next indication that needs to be handled. If no more indications need to be handled, the dispatch table branches to the code which exits from the interrupt service routine.

| | |
|---|---|
| Segment: | ISREntrySeg |
| Inputs: | DS is set to the driver's data segment selector. |
| Outputs: | ES is set to the Adapter's RAM segment selector. |
| Interrupt State: | Disabled on entry and enabled on exit. |

OS/2 386 DevHlp ISREntry

Description—This routine contains the interrupt entry point for the SlapStick adapter interrupt. The code in this routine is specifically optimized for the OS/2 80386/486 environment when devHelp calls should always be called. The ISREntry code handles the "housekeeping" chores that need to be taken care of before the indication(s) that caused the interrupt can be handled. This routine first checks to see if our adapter generated the interrupt or if we need to chain to another interrupt service routine. All adapter interrupts are disabled and system interrupt are re-enabled.

This routine also contains the code to handle a received packet indication. Because this indication is the most common type of indication it is handled as fall-through code. The other indications are handled by branching through a dispatch table. If a received packet caused the indication the RcvFrameStatus is polled to verify that the packet has been completely received. The LengthLeftThresh register is the modified, if necessary, and ReceiveLookAhead is called. The SlapStick LookAhead window is then advanced.

A dispatch table is used to branch to the next indication that needs to be handled. If no more indications need to be handled, the dispatch table branches to the code which exits from the interrupt service routine.

| | |
|---|---|
| Segment: | ISREntrySeg |
| Inputs: | DS is set to the driver's data segment selector. |
| Outputs: | ES is set to the Adapter's RAM segment selector. |
| Interrupt State: | Disabled on entry and enabled on exit. |

OS/2 286 XmitComplete

Description—This routine is called through the PrimaryIntDispatch or SecondaryIntDispatch table when an XmitComplete indication occurs. This code is specifically optimized for the OS/2 80286 environment. This routine adjusts the XmitCompleteThresh register, if necessary, and calls the protocol's transmit confirm procedure.

A dispatch table is used to branch to the next indication that needs to be handled. If no more indications need to be handled, the dispatch table branches to the code which exits from the interrupt service routine.

| | |
|---|---|
| Segment: | XmitCompleteSeg |
| Inputs: | ES is set to the Adapter's RAM segment selector. |
| Outputs: | None. |
| Interrupt State: | Unknown on entry and unchanged. |

OS/2 386 XmitComplete

Description—This routine is called through the PrimaryIntDispatch or SecondaryIntDispatch table when an XmitComplete indication occurs. This code has been specifically optimized for the OS/2 80386/80486 environment. This routine adjusts the XmitCompleteThresh register, if necessary, and calls the protocol's transmit confirm procedure.

A dispatch table is used to branch to the next indication that needs to be handled. If no more indications need to be handled, the dispatch table branches to the code which exits from the interrupt service routine.

| | |
|---|---|
| Segment: | XmitCompleteSeg |
| Inputs: | ES is set to the Adapter's RAM segment selector. |
| Outputs: | None. |
| Interrupt State: | Unknown on entry and unchanged. |

OS/2 286 ISRExit

Description—This routine is branched to through the PrimaryIntDispatch or the SecondaryIntDispatch table. This routine is optimized for the OS/2 80286 environment. The purpose of this routine is to call indication complete, if necessary, and return from the interrupt context.

| | |
|---|---|
| Segment: | ISRExitSeg |
| Inputs: | ES contains the adapter's RAM segment selector. |
| Outputs: | None. |
| Interrupt State: | Cleared on entry, enabled if IndicationComplete is called, enabled when the IRET instruction is executed. |

OS/2 386 ISRExit

Description—This routine is branched to through the PrimaryIntDispatch or the SecondaryIntDispatch table. This routine has been optimized for the OS/2 80386/80486 environment. The purpose of this routine is to call indication complete, if necessary, and return from the interrupt context.

| | |
|---|---|
| Segment: | ISRExitSeg |
| Inputs: | ES contains the adapter's RAM segment selector. |
| Outputs: | None. |
| Interrupt State: | Cleared on entry, enabled if IndicationComplete is called, enabled when the IRET instruction is executed. |

OS/2OtherIndication

Description—This routine is called from the other indication handlers through the PrimaryIntDispatch or the SecondaryIntDispatch table. The purpose of this routine is to handle an OtherIndication indication (bit 5 in the IndicationComplete register ). The OtherIndication indication may be caused by one of three events.

First, when the protocol has requested that an interrupt be generated this indication is generated. This routine calls the protocol's interrupt status indication.

Second, when the protocol has requested that the MAC driver be reset this indication is generated. This routine calls the StartReset and EndReset status indications, and performs the actual reset of the adapter and the MAC driver.

The third reason this indication may be generated is when the transmitter encounters a DMA underrun error. This is caused when the adapter is transmitting a packet on the network faster than the bus master can load the packet data onto the adapter. In this case, the XmitStartThresh register is increased to allow more data to be resident on the adapter before a transmit begins.

| Segment: | SupportCodeSeg |
|---|---|
| Inputs: | ES contains the adapter's RAm segment selector. |
| Outputs: | None. |
| Interrupt State: | Unknown on entry and may be enabled. |

CONCLUSION

In sum, a self-contained, executable module of an operating system normally stored in mass memory for use in any one of a plurality of variant host architectures is provided which is first loaded into user memory space of the central processing unit, and then executed to optimize the module for any one of the plurality of host variant architectures. It involves sensing the type of central processing unit in use, relocating a portion of the loaded executable file into an optimized segment of user accessible memory space, which may include overwriting other portions of the memory space occupied by the executable module itself, redirecting all the vectors and interrupts in accordance with the type of CPU in use and the relocated code block, and discarding all surplus segments of the executable code in the loaded module to free the memory for use by other applications programs, and/or operating system modules.

The invention may be implemented either in the form of an executable file or it may be implemented in the form of a device driver. The relocated segment of the executable code module may overwrite memory locations of other portions of the same executable code or, alternatively, the segment of code may be relocated into a protected memory space as defined in connection with the central processing unit and/or operating system, in order to free up a maximum amount of user accessible memory space for other programs.

Therefore, the goals of providing the fastest possible software module, in as little memory space as possible, are achieved in the present invention. The invention is particularly useful in systems such as device drivers for network interfaces, which must remain resident in host memory throughout active processing which involves the network. These systems occupy a portion of a host memory, and limit the use of host memory for other applications. It is necessary that such code be optimized for speed and space as taught by the present invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for initializing operating system software for controlling an add-on device in a host data processing system, the host having any one of a plurality of variant architectures, comprising:

loading into host memory an initialize module including a set of operating system code blocks for the add-on device, each code block adapted for at least one of the plurality of variant architecture, the initialize module including tables for indentifying locations of code blocks, and of location-dependent entries within code blocks;

after loading the initialize module, executing an identifying portion of the initialize module to identify the variant architecture of the host;

after executing the identifying portion, executing a selecting portion of the initialize module to select a subset of the set of operating system code blocks adapted for the identified variant architecture, including accessing the tables in response to the identified variant architecture to identify selected code blocks;

placing the subset within the host memory in contiguous memory locations, including accessing selected code blocks and updating location-dependent entries in selected code blocks; and freeing memory locations in host memory of the initialize module outside the contiguous memory locations.

2. The method of claim 1, wherein the set of operating system code blocks in the initialize module comprises a plurality of functional segments, each functional segment in the plurality including at least one code block, and the step of executing a selecting portion includes:

selecting a code block form each functional segment in the plurality of functional segments.

3. The method of claim 1, wherein the step of loading includes storing the initialize module in a memory space beginning at a first address and ending at a second address; and the contiguous memory locations begin at the first address and end at a third address; and the step of freeing includes freeing memory locations between the third and second addresses.

4. The method of claim 1, wherein at least one of the plurality of variant architectures includes a configuration table storing variables identifying attributes of the host architecture, and the initialize module includes an architecture variable, and the step of executing an identifying portion includes:

parsing the configuration table; and updating the architecture variable in response to entries in the configuration table.

5. The method of claim 1, wherein the initialize module includes an architecture variable, and the step of executing an identifying portion includes:

executing tests to determine features of the host architecture; and updating the architecture variable in response to results of the tests.

6. The method of claim 1, wherein the add-on device comprises a network interface, and the operating system software for the network interface includes code for transmitting and receiving data through the network interface.

7. The method of claim 1, wherein host architecture includes a limited address space and the subset of code blocks for the add-on device occupies host memory during execution of applications software.

8. A method for initializing operating system software for controlling an add-on device in a host data processing system, the host having any one of a plurality of variant architectures and limited host memory, comprising:

loading into a memory space beginning at a first address and ending at a Second address in host memory an initialize module, the initialize module including an environment variable, and a plurality of functional segments, each functional segment in the plurality including at least one code block for the add-on device, each code block adapted for at least one of the plurality of variant architectures, and tables for identifying a code block in each functional segment in response to the environment variable;

executing an identifying portion of the initialize module to identify the variant architecture of the host and to update the environment variable to indicate the identified variant architecture;

executing an accessing portion of the initialize module to access the tables in response to the updated environment variable to select a code block adapted for the indicated variant architecture from each of the plurality of functional segments;

placing the selected code blocks within the host memory in contiguous memory locations beginning at the first address and ending at a third address; and freeing memory locations of the initialize module in host memory outside the contiguous memory locations between the third address and the second address.

9. The method of claim 8, wherein the tables in the initialize module identify location-dependent entries within the selected code blocks; and the step of placing includes:

accessing selected code blocks and updating location-dependent entries in selected code blocks.

10. The method of claim 8, wherein at least one of the plurality of variant architectures includes a configuration table storing variables identifying attributes of the host architecture and the step of executing an identifying portion includes:

parsing the configuration table; and updating the architecture variable in response to entries in the configuration table.

11. The method of claim 8, wherein the step of executing an identifying portion includes:

executing tests to determine features of the host architecture; and updating the architecture variable in response to the results of the tests.

12. The method of claim 8, wherein the add-on device comprises a network interface, and the operating system software for the network interface includes code for transmitting and receiving data through the network interface.

* * * * *